United States Patent
Hitt et al.

(10) Patent No.: US 9,554,303 B1
(45) Date of Patent: Jan. 24, 2017

(54) SYSTEM AND METHOD FOR COMMUNICATING USING BANDWIDTH ON DEMAND

(71) Applicant: PlusN, LLC, Elmsford, NY (US)

(72) Inventors: Richard E. Hitt, New Fairfield, CT (US); Per Von Zelowitz, New York, NY (US); Brent Hansen Horine, Englewood, NJ (US); Karthikesh Raju, Espoo (FI)

(73) Assignee: PLUSN LLC, Elmsford, NY (US)

( * ) Notice: Subject to any disclaimer, the term of this patent is extended or adjusted under 35 U.S.C. 154(b) by 84 days.

(21) Appl. No.: 14/335,061

(22) Filed: Jul. 18, 2014

Related U.S. Application Data

(62) Division of application No. 13/669,026, filed on Nov. 5, 2012, now Pat. No. 8,787,873.

(60) Provisional application No. 61/555,585, filed on Nov. 4, 2011.

(51) Int. Cl.
| | |
|---|---|
| *H04W 52/02* | (2009.01) |
| *H04W 28/20* | (2009.01) |
| *H04W 72/08* | (2009.01) |

(52) U.S. Cl.
CPC ........... *H04W 28/20* (2013.01); *H04W 72/085* (2013.01)

(58) Field of Classification Search
CPC ............. H04L 12/2465; H04L 12/2634; H04L 29/06523; H04L 29/08792; H04L 29/06537; H04L 41/5067; H04L 65/80
See application file for complete search history.

(56) References Cited

U.S. PATENT DOCUMENTS

| | | |
|---|---|---|
| 5,302,914 A | 4/1994 | Arntz et al. |
| 5,642,155 A | 6/1997 | Cheng |
| 5,721,815 A | 2/1998 | Ottesen et al. |
| 5,745,480 A | 4/1998 | Behtash et al. |
| 5,790,549 A | 8/1998 | Dent |
| 5,828,737 A | 10/1998 | Sawyer |

(Continued)

OTHER PUBLICATIONS

X. Li and L. J. Cimini, "Effects of Clipping and Filtering on the Performance of OFDM", IEEE Commun. Lett., vol. 2, No. 5, pp. 131-133, May 1998.

(Continued)

*Primary Examiner* — Warner Wong
(74) *Attorney, Agent, or Firm* — Steven M. Hoffberg. Esq.; Ostrolenk Faber LLP

(57) ABSTRACT

A system and method for dynamically changing the quality of service (QoS) for a subscriber of a cellular radio system. Bandwidth-on-Demand (BoD) enables the subscriber to dynamically switch to higher bandwidth and to enable a higher throughput. This may be for a limited time or amount of data, for example. The initiation may be by the subscriber, carrier, sponsor, or automatically by an application. The QoS increase may be dynamically priced in a kind of auction. The wireless device may contact the policy servers of a multiple network operator (MNO), which in turn contacts the Authentication, Authorization and Accounting (AAA) server in the MNO's core network. The policy server contacts the scheduler on the serving basestation which then determines whether to allocate more resources (i.e. bandwidth in the form of subcarriers, resource blocks, resource elements, timeslots) to the subscriber. The initiation may start a timer or data counter.

19 Claims, 7 Drawing Sheets

(56) References Cited

U.S. PATENT DOCUMENTS

| | | | |
|---|---|---|---|
| 5,936,949 A | 8/1999 | Pasternak et al. | |
| 5,956,337 A | 9/1999 | Gaddis | |
| 5,970,068 A | 10/1999 | Gray et al. | |
| 6,006,069 A | 12/1999 | Langston | |
| 6,016,311 A | 1/2000 | Gilbert et al. | |
| 6,028,843 A | 2/2000 | Delp et al. | |
| 6,061,562 A | 5/2000 | Martin et al. | |
| 6,088,335 A | 7/2000 | I et al. | |
| 6,101,174 A | 8/2000 | Langston | |
| 6,112,056 A | 8/2000 | Langston | |
| 6,169,748 B1 * | 1/2001 | Barbas | H04L 12/5601 370/395.43 |
| 6,230,005 B1 | 5/2001 | Le et al. | |
| 6,240,274 B1 | 5/2001 | Izadpanah | |
| 6,246,713 B1 | 6/2001 | Mattisson | |
| 6,307,836 B1 | 10/2001 | Jones et al. | |
| 6,363,074 B1 | 3/2002 | Schmidt et al. | |
| 6,370,391 B1 | 4/2002 | Lietsalmi et al. | |
| 6,377,561 B1 | 4/2002 | Black et al. | |
| 6,381,289 B1 | 4/2002 | Dutta | |
| 6,556,820 B1 | 4/2003 | Le et al. | |
| 6,661,781 B1 | 12/2003 | Chitre et al. | |
| 6,683,866 B1 | 1/2004 | Stanwood et al. | |
| 6,693,887 B2 | 2/2004 | Stanwood et al. | |
| 6,738,348 B1 | 5/2004 | Rollins | |
| 6,741,575 B1 | 5/2004 | Zhang et al. | |
| 6,757,268 B1 | 6/2004 | Zendle | |
| 6,769,089 B1 | 7/2004 | Gupta | |
| 6,771,660 B1 | 8/2004 | Bourlas et al. | |
| 6,785,252 B1 | 8/2004 | Zimmerman et al. | |
| 6,804,521 B2 | 10/2004 | Tong et al. | |
| 6,842,437 B1 | 1/2005 | Heath | |
| 6,847,633 B1 | 1/2005 | Ryu et al. | |
| 6,850,732 B2 | 2/2005 | Patterson et al. | |
| 6,912,393 B1 | 6/2005 | Rodriguez et al. | |
| 6,925,128 B2 | 8/2005 | Corral | |
| 6,956,834 B2 | 10/2005 | Stanwood et al. | |
| 6,963,730 B2 | 11/2005 | Chambers et al. | |
| 6,985,455 B1 | 1/2006 | Heath et al. | |
| 7,002,904 B2 | 2/2006 | Jung | |
| 7,016,375 B1 | 3/2006 | Rosenberg et al. | |
| 7,020,472 B2 | 3/2006 | Schmidt | |
| 7,106,781 B2 | 9/2006 | Agee et al. | |
| 7,119,614 B2 | 10/2006 | Ichitsubo et al. | |
| 7,130,283 B2 | 10/2006 | Vogel et al. | |
| 7,133,395 B2 | 11/2006 | Simonsen et al. | |
| 7,190,683 B2 | 3/2007 | Giallorenzi et al. | |
| 7,218,936 B2 | 5/2007 | Rinne et al. | |
| 7,277,397 B1 * | 10/2007 | Kreppel | H04L 12/1432 370/252 |
| 7,292,639 B1 | 11/2007 | Demirekler et al. | |
| 7,293,223 B2 | 11/2007 | Gupta | |
| 7,299,064 B1 | 11/2007 | Paranchych et al. | |
| 7,301,891 B2 | 11/2007 | Park et al. | |
| 7,315,580 B2 | 1/2008 | Feng et al. | |
| 7,321,629 B2 | 1/2008 | Feng et al. | |
| 7,339,884 B2 | 3/2008 | Bar-Ness et al. | |
| 7,340,006 B2 | 3/2008 | Yun et al. | |
| 7,342,978 B2 | 3/2008 | Feng et al. | |
| 7,345,990 B2 | 3/2008 | Son | |
| 7,349,817 B2 | 3/2008 | Cha | |
| 7,376,074 B2 | 5/2008 | Jung et al. | |
| 7,376,202 B2 | 5/2008 | Bar-Ness et al. | |
| 7,443,814 B2 | 10/2008 | Agarwal et al. | |
| 7,443,904 B2 | 10/2008 | Choi et al. | |
| 7,463,698 B2 | 12/2008 | Fujii et al. | |
| 7,467,338 B2 | 12/2008 | Saul | |
| 7,486,639 B2 | 2/2009 | Stanwood et al. | |
| 7,496,028 B2 | 2/2009 | Jung et al. | |
| 7,499,496 B2 | 3/2009 | Fujii et al. | |
| 7,529,193 B2 | 5/2009 | Zimmerman et al. | |
| 7,535,950 B2 | 5/2009 | Chen et al. | |
| 7,548,529 B2 | 6/2009 | Nambirajan | |
| 7,643,489 B2 | 1/2010 | Wang et al. | |
| 7,656,845 B2 | 2/2010 | Schmidt | |
| 7,672,309 B1 | 3/2010 | Jones | |
| 7,684,807 B2 | 3/2010 | Schmidt | |
| 7,809,403 B2 | 10/2010 | Chang et al. | |
| 7,860,076 B2 | 12/2010 | Stanwood | |
| 7,899,463 B2 | 3/2011 | Rinne et al. | |
| 7,916,816 B2 | 3/2011 | Currivan et al. | |
| 7,925,211 B2 | 4/2011 | Agarwal et al. | |
| 8,027,298 B2 | 9/2011 | Stanwood et al. | |
| 8,614,945 B2 * | 12/2013 | Brunnenmeyer | H04B 7/18584 370/230 |
| 8,972,553 B2 * | 3/2015 | Jin | H04L 41/0806 370/230 |
| 2002/0093925 A1 * | 7/2002 | Chuah | H04L 47/2491 370/332 |
| 2003/0236087 A1 | 12/2003 | Stenton | |
| 2004/0199635 A1 * | 10/2004 | Ta | H04L 12/5695 709/226 |
| 2004/0203828 A1 * | 10/2004 | Mirchandani | H04W 16/02 455/452.1 |
| 2004/0228354 A1 * | 11/2004 | Anschutz | H04L 12/2859 370/395.21 |
| 2005/0089109 A1 | 4/2005 | Yun et al. | |
| 2005/0089116 A1 | 4/2005 | Moffatt et al. | |
| 2005/0100108 A1 | 5/2005 | Yun et al. | |
| 2005/0238110 A1 | 10/2005 | Yun et al. | |
| 2005/0265468 A1 | 12/2005 | Fujii et al. | |
| 2005/0270968 A1 | 12/2005 | Feng et al. | |
| 2006/0078066 A1 | 4/2006 | Yun et al. | |
| 2006/0098747 A1 | 5/2006 | Yue et al. | |
| 2006/0115010 A1 | 6/2006 | Rog et al. | |
| 2006/0120268 A1 | 6/2006 | Bar-Ness et al. | |
| 2006/0120269 A1 | 6/2006 | Kim et al. | |
| 2006/0126748 A1 | 6/2006 | Lin et al. | |
| 2006/0215732 A1 | 9/2006 | Chen et al. | |
| 2006/0245346 A1 | 11/2006 | Bar-Ness et al. | |
| 2006/0247898 A1 | 11/2006 | Cha | |
| 2006/0268672 A1 | 11/2006 | Sari | |
| 2007/0019537 A1 | 1/2007 | Paulraj | |
| 2007/0037548 A1 * | 2/2007 | Sammour | H04W 52/0235 455/343.2 |
| 2007/0076588 A1 | 4/2007 | Alapuranen | |
| 2007/0089015 A1 | 4/2007 | Saul | |
| 2007/0092017 A1 | 4/2007 | Abedi | |
| 2007/0098094 A1 | 5/2007 | Yue et al. | |
| 2007/0121483 A1 | 5/2007 | Zhang et al. | |
| 2007/0140367 A1 | 6/2007 | Braithwaite | |
| 2007/0189334 A1 | 8/2007 | Awad | |
| 2007/0217329 A1 | 9/2007 | Abedi | |
| 2007/0223365 A1 | 9/2007 | Tsfaty et al. | |
| 2007/0291860 A1 | 12/2007 | Wang et al. | |
| 2008/0008084 A1 | 1/2008 | Son | |
| 2008/0049602 A1 | 2/2008 | Jung et al. | |
| 2008/0084887 A1 * | 4/2008 | Proctor | H04W 4/02 370/395.21 |
| 2008/0112496 A1 | 5/2008 | Devlin et al. | |
| 2008/0232235 A1 | 9/2008 | Kowalski et al. | |
| 2008/0267312 A1 | 10/2008 | Yokoyama | |
| 2008/0285432 A1 | 11/2008 | Ueng et al. | |
| 2008/0285673 A1 | 11/2008 | Han et al. | |
| 2008/0298490 A1 | 12/2008 | Yun et al. | |
| 2008/0310383 A1 | 12/2008 | Kowalski | |
| 2009/0003308 A1 | 1/2009 | Baxley et al. | |
| 2009/0011722 A1 | 1/2009 | Kleider et al. | |
| 2009/0016464 A1 | 1/2009 | Zheng et al. | |
| 2009/0034407 A1 | 2/2009 | Lindh | |
| 2009/0046702 A1 | 2/2009 | Luo et al. | |
| 2009/0052561 A1 | 2/2009 | Baxley et al. | |
| 2009/0052577 A1 | 2/2009 | Wang | |
| 2009/0060070 A1 | 3/2009 | Hayase et al. | |
| 2009/0060073 A1 | 3/2009 | Yano et al. | |
| 2009/0067318 A1 | 3/2009 | Kowalski | |
| 2009/0074093 A1 | 3/2009 | Han et al. | |
| 2009/0080500 A1 | 3/2009 | Muharemovic et al. | |
| 2009/0086848 A1 | 4/2009 | Han et al. | |
| 2009/0097579 A1 | 4/2009 | Yeon et al. | |
| 2009/0110033 A1 | 4/2009 | Shattil | |
| 2009/0110034 A1 | 4/2009 | Kowalski | |
| 2009/0135949 A1 | 5/2009 | Yu | |

(56) References Cited

U.S. PATENT DOCUMENTS

| | | | |
|---|---|---|---|
| 2009/0147870 A1 | 6/2009 | Lin et al. | |
| 2009/0186584 A1* | 7/2009 | Lambrecht | H04W 52/241 455/67.11 |
| 2009/0225762 A1* | 9/2009 | Davidson | H04L 12/4675 370/401 |
| 2009/0238064 A1 | 9/2009 | Lee et al. | |
| 2009/0303868 A1 | 12/2009 | Kimura | |
| 2010/0002800 A1 | 1/2010 | Kim et al. | |
| 2010/0124294 A1 | 5/2010 | Birru et al. | |
| 2010/0142475 A1 | 6/2010 | Kim et al. | |
| 2011/0134755 A1* | 6/2011 | Wright | H04L 41/5025 370/235 |
| 2011/0158303 A1* | 6/2011 | Gauthier | H04W 52/0283 375/224 |
| 2011/0314145 A1 | 12/2011 | Raleigh et al. | |
| 2012/0088470 A1 | 4/2012 | Raleigh | |
| 2013/0117092 A1* | 5/2013 | Cai | H04L 12/14 705/14.31 |

OTHER PUBLICATIONS

L. J Cimini and N. R. Sollenberger, "Peak-to-Average Power Ratio Reduction of an OFDM Signal Using Partial Transmit Sequences", IEEE Commun. Lett., vol. 4, No. 3, pp. 86-88, Mar. 2000.
G. Hill and M. Faulkner, "Cyclic Shifting and Time Inversion of Partial Transmit Sequences to Reduce the Peak-to-Average Ratio in OFDM", PIMRC 2000, vol. 2, pp. 1256-1259, Sep. 2000.
Xia Lei, Youxi Tang, Shaoqian Li, "A Minimum Clipping Power Loss Scheme for Mitigating the Clipping Noise in DFDM", Globecom 2003, IEEE, vol. 1, pp. 6-9, Dec. 2003.
S. H. Muller and J. B. Huber, "A Novel Peak Power Reduction Scheme for OFDM", Proc. of PIMRC '97, pp. 1090-1094, 1997.
G. R. Hill, Faulkner, and J. Singh, "Deducing the Peak-to-Average Power Ratio in OFDM by Cyclically Shifting Partial Transmit Sequences", Electronics Letters, vol. 36, No. 6, Mar. 16, 2000.
Vijayarangan, et al., "An overview of techniques for reducing peak to average power ratio and its selection criteria for orthogonal frequency division multiplexing radio systems", Journal of Theoretical and Applied Information Technology, vol. 5, No. 5 (Feb. 2009).
Hussain, et al., "Tone reservation's complexity reduction using fast calculation of maximal IDFT element", IEEE, IWCMC 08, Greece (2008).
Zhao, et al., "A study on the PAPR reduction by hybrid algorithm based on the PTS and GS technique", The Journal—of the Korean Institute of Communication Sciences, vol. 31, No. 2A, p. 187, Feb. 2006.
Marsalek, "On the reduced complexity interleaving method for OFDM PAPR reduction", Radioengineering, vol. 1, No. 3, Sep. 2006.
Wu, et al., "8B/10B Codec for efficient PAPR reduction in OFDM communication systems", IEEE Int'l Conf on Wireless Communications, Networking and Mobile Computing (WCNMC), Jun. 13-16, 2005, Maui, Hi, USA.
Hussein, et al., "Performance enhancement of STBC OFDM-CDMA system using channel coding techniques over multipath fading channel", Journal of Theoretical and Applied Information Technology, vol. 5, No. 5, pp. 591-601, Jun. 2009.
Muller, et al., "OFDM with reduced peak-to-average power ratio by multiple signal representation", Annals of Telecommunications, vol. 52, No. 1-2, pp. 58-67, Feb. 1997.
Mobasher, et al., "Integer-based constellation shaping method for PAPR reduction in OFDM systems", IEEE Transactions on Communications, vol. 54, pp. 119-126, Jan. 2006.
Deumal, et al., "Peak reduction of multi-carrier systems by controlled spectral outgrowth", Proc. IEEE Intl. Conf. on Acoustics, Speech and Signal Processing (ICASSP), Jan. 2006.
Wen, et al., "The PAPR reduction in OFDM system with the help of signal mapping scheme", International Journal of Applied Science and Engineering 2007, 5, 1: 75-80.
Sohn, RBF neural network based SLM peak-to-average power ratio reduction in OFDM systems, ETRI Journal, vol. 29, No. 3, Jun. 2007.
Sathananthan, et al., "Reducing intercarrier interference in OFDM systems by partial transmit sequence and selected mapping", Proc. Int'l. Symp. on DSP for Comm. Systems, 2002.
Tseng, et al., "A reduced-complexity PTS scheme for peak-to-average power ratio reduction in OFDM systems", Proc. European Society for Signal Processing (EURASIP) 2008.
Behravan, et al., "Iterative estimation and cancellation of nonlinear distortion in OFDM systems", www.mantracom.com/downloads Jun. 19, 2008.
Vijayarangan, et al., "Reducing peak to average power ratio in orthogonal frequency division multiplexing using modified peak factor mapping", IE(I) Journal-ET (Feb. 2008).
Pradabpet, et al., "A new PAPR reduction in OFDM systems using PTS combined with APPR for TWTA nonlinear HPA", Songklanakarin J. Sci. Technol. 30 (3), 355-360, May-Jun. 2008.
Matejka, "DRM PAPR distribution and its relation to classical AM power amplifier", www.urel.feec.vutbr.cz/ra2008/archive/ra2003/papers/169.pdf, Radioelektronika 2003.
De Figueiredo, "Adaptive pre-distorters for linearization of high power amplifiers in OFDM wireless commmunications", IEEE North Jersey Section CASS/EDS Chapter, Distinguished lecture.
Taha, Performance analysis of ICC technique for OFDM PAPR reduction and its application over BTC, Master's degree project, Stockholm, Sweden 2006.
Jayalath, et al., "On the PAR reduction of OFDM signals using multiple signal representation", IEEE communications Letters, vol. 8, No. 7, Jul. 2004.
Andgart, et al., "Designing Tone Reservation PAR reduction", EURASIP Journal on applied Signal Processing, of 2006, article ID 38237, pp. 1-14.
Siegl, et al., "Partial transmit sequences for Peak-to-average power ratio reduction in multiantenna OFDM", EURASIP Journal on Wireless Communications and Networking, vol. 2008, article ID 325829, 11 pages.
Wen, et al., "A sub-optimal PTS algorithm based on particle swarm optimization technique for PAPR reduction in OFDM systems", EURASIP J. Wireless Commun. and Networking (Jan. 2008).
Deng, et al., "OFDM PAPR reduction using clipping with distortion control", Proc. 2005 IEEE Conf. on Communications.
Lin, et al., "Selective-mapping type peak power reduction techniques for turbo coded OFDM", 2005 International Conference on Wireless Networks, Communications and Mobile Computing.
Al-Kebsi, et al., "Throughput enhancement and performance improvement of the OFDM based WLAN system", IJCSNS International Journal of Computer Science and Network Security, vol. 9, No. 4, Apr. 2009.
Giannopoulos, et al., "Novel efficient weighting factors for PTS-based PAPR reduction in low-power OFDM transmitters",www.eurasip.org/proceedings/Eusipco/Eusipco2006/papers/1568982220 2006.
Wulich, et al., "Is PAPR reduction always justified for OFDM?", Proc. European Wireless Conference, 2007.
Wesolowski, "On the PAPR minimization using selected mapping algorithm in pilot-assisted OFDM systems", Proc. European Wireless Conference, 2007.
Alharbi, et al., "A combined SLM and closed-loop QO-STBC for PAPR mitigation in MIMO-OFDM transmission". www.eurasip.org/proceedings/Eusipco/Eusipco2008/papers/1569102063 2008.
Yang, et al., "Selective vector perturbation precoding and peak to average power ratio reduction of OFDM systems", Proc. IEEE Global Telecommunications Conf., 2008.
Tsai, et al., "A tail-biting turbo coded OFDM system for Papr and Ber reduction", 2007 IEEE Vehicular Technology Conference.
Baxley, "Analyzing selected mapping for peak-to-average power reduction in OFDM", Thesis, School of Electrical and Computer Engineering, Georgia Institute of Technology, May 2005.

(56) References Cited

OTHER PUBLICATIONS

Wang, "Peak to average power ratio reduction for OFDM", Research & Standards LGE Mobile Research, USA, Aug. 27, 2007, 3GPP2, TSG-C NTAH.

Park, et al., "Tone reservation method for PAPR reduction scheme", IEEE 802.16e-03/60.

Breiling, et al., "SLM peak-power reduction without explicit side information", IEEE Communications Letters, vol. 5, No. 6, Jun. 2001.

Guel, et al., "Approximation of the average power variation for geometric adding signal approach of PAPR reduction in context of OFDM signals", Union Radio Scientitique Internationale—URSI, Aug. 7-16, 2008, Chicago, IL.

Hussain, et al., "Peak to average power ratio reduction for multi-band OFDM system using tone reservation", www.ursi-test.intec.ugent.be/files/URSIGA08/papers/CPS2p5 2008.

Valbonesi, et al., "Low-complexity method for PAPR reduction in OFDM based on frame expansion parameter selection", 13th European Signal Processing Conference, Sep. 4-8, 2005, Antalya, Turkey.

Breiling, et al., "Distortionless reduction of peak power without explicit side information", 2000 IEEE Global Telecommunications Conference.

Jayalath, et al., "Use of data permutation to reduce the peak-to-average power ratio of an OFDM signal", Wireless communications and Mobile Computing, 2002, 2:187-203.

Jayalath, et al., "On the PAR reduction of OFDM signals using multiple signal representation", IEEE commmunications Letters, vol. 8, No. 7, Jul. 2004.

Jayalath, et al., "SLM and PTS peak-power reduction of OFDM signals without side information", IEEE Trans. on Wireless Communications, vol. 4, No. 5, Sep. 2005.

Veeragandham, "Orthogonal frequency division multiplexing" EECS 865:Wireless Communications.

Fischer, et al., "Directed selected mapping for peak-to-average power ratio reduction in MIMO OFDM", Proc. International OFDM Workshop, 2007.

Fischer, "Widely-linear selected mapping for peak-to-average power ratio reduction in OFDM", Electronics Letters, vol. 43, 2007.

Wang, "Reduction of the PAPR in OFDM signals by applying PTS mechanism", Master Thesis, Institute of Communication Engineering, Tatung University, Jan. 2004.

Lin, "Performance analysis in the PAPR of OFDM system via SLM scheme", Master Thesis, Institute of Communication Engineering, Tatung University, Jan. 2004.

Rajbanshi, et al., "Peak-to-average power ratio analysis for NC-OFDM transmissions", Proc. 2007 IEEE Vehicular Technology Conference.

Saito, et al., "PAPR reduction of MC-CDMA signals by selected mapping with interleavers", Multi-Carrier Spread-Spectrum, Springer Netherlands, pp. 453-460.

Habendorf, et al., "Nonlinear predistortion with reduced peak-to-average power ratio", Proc. International Symposium on Wireless Communications.

Hosseini, et al., "PAPR reduction in OFDM systems using polynomial-based compressing and iterative expanding", 2006 IEEE ICASSP.

Fischer, et al., "Peak-to-average power ratio reduction in MIMO OFDM", Proc. 2007 Int. Conf on Communications, pp. 762-767.

Ragusa, et al., "Invertible clipping for increasing the power efficiency of OFDM amplification", Proc. 2007 IEEE Int. Symposium on Personal Indoor and Mobile Radio Communications.

Sezginer, et al., "Metric-based symbol predistortion techniques for peak power reduction in OFDM systems", IEEE Trans. on Wireless Communications, vol. 6, No. 7, Jul. 2007.

Siegl, et al., "Peak-to-average power ratio reduction in multi-user OFDM", Proc. 2007 IEEE Int. Symp. on Information Theory.

Henkel, et al., "Partial transmit sequences and trellis shaping", Proc. 5th Int. ITC Conf. on Source and Channel coding, 2004.

Lee, et al., "Unitary peak power reduction for short packet communications in multiple transmit antennas", IEEE Trans. Commun., vol. 56, Feb. 2008, pp. 234-244.

Loyka, et al., "On the peak factor of sampled and continuous signals", Proc. 2006 IEEE Vehicular Technology Conf.

Lin, et al., "Selective-mapping type peak power reduction techniques for turbo coded OFDM", 2005 IEEE Conf. on Wireless Networks, Communications and Mobile Computing.

Bonaccorso, et al., "Reducing the peak to average power ratio in OFDM systems", Dix-septieme colloqueGRETSI, Vannes, Sep. 13-17, 1999.

Baxley, et al., "Assessing peak-to-average power ratios for communications applications", Proc. IEEE Military communications Conf (MILCOM 2004).

Chen, et al., "A modified selective mapping with PAPR reduction and error correction in OFDM systems", 2007 IEEE Wireless Com. and Networking Conf., pp. 1329-1333.

Fischer, "Peak-to-average power ratio (PAR) reduction in OFDM based on lattice decoding", Proc. Int. OFDM Workshop.

Siegl, et al., "Directed selected mapping for peak-to-average power ratio reduction in single-antenna OFDM", Proc. Int. OFDM Workshop.

Ciochina, et al., An analysis of OFDM peak power reduction techniques for WiMAX systems, Proc. 2006 Int. Conf on Communications, pp. 4676-4681.

Malkin, et al., "Dynamic allocation of reserved tones for PAR reduction", OFDM Workshop, Aug. 2008, Hamburg Germany.

Pradabpet, et al., "A new PTS method using GA for PAPR reduction in OFDM-WLAN 802.11a systems", www.csse.org/slide/comp_int/P0014.pdf.

Wu, et al., "Peak-to-average power ratio reduction in OFDM based on transformation of partial transmit sequences", dectronics Letters, Jan. 19, 2006, vol. 42, No. 2.

Haider, "Peak to average ratio reduction in wireless OFDM communication systems", Thesis, Blekinge Institute of Technology, Jan. 2006.

Henkel, et al., Another application for trellis shaping: PAR reduction for DMT (OFDM), IEEE Transactions on Communications, vol. 48, No. 9, Sep. 2000.

Fischer, et al., "Peak-to-average power ratio reduction in single- and multi-antenna OFDM via directed selected napping", Jul. 19, 2007.

Herraiz, "Multicarrier communication systems with low sensitivity to nonlinear amplification", Thesis, Eng. i Arquitectura La Salle, Univers. Ramon Llull, Barcelona 2008.

Kasiri, et al., "A preprocessing method for PAPR reduction in OFDM systems by modifying FFT and IFFT matrices", The 18th Annual IEEE International Symposium on Personal, Indoor and Mobile Radio Communications (PIMRC'07).

Malkin, et al., "Optimal constellation distortion for PAR reduction in OFDM systems", Proc. 2008 PIMRC.

Wei, et al., "A modern extreme value theory approach to calculating the distribution of the peak-to-average power ratio in OFDM systems", 2002 IEEE Int. Conf. on Communications, vol. 3, pp. 1686-1690.

Rajbanshi, et al., "Adaptive-mode peak-to-average power ratio reduction algorithm for OFDM-based cognitive radio", 2006 IEEE Vehicular Technology Conf.

Ren, "An improved selected mapping scheme for PAPR reduction in OFDM systems", Thesis, University of Cincinnati.

Boonsrimuang, et al., "Mitigation of non-linear distortion using PTS and IDAR method for multi-level QAM-OFDM system", ECTI Transactions on Computer and Information Technology, vol. 1, No. 2, Nov. 2005.

Schenk, et al., "The application of spatial shifting for peak-to-average power ratio reduction in MIMO OFDM systems", Proc. 2006 IEEE Vehicular Technol. Conf.

Schenk, et al., "Peak-to-average power reduction in space division multiplexing based OFDM systems through spatial shifting", Electronics Letters, Jul. 21, 2005, vol. 41, No. 15.

Nawaz, et al., "PAPR reduction technique for OFDM systems with rotated MPSK constellations and coordinate Interleaving", Proc. 2008 IEEE Symp on Comm. & Veh. Technol.

(56) References Cited

OTHER PUBLICATIONS

Van Welden, et al., "Clipping versus symbol switching for PAPR reduction in coded OFDM", 15th Annual Symposium of the IEEE/CVT Benelux Chapter, Nov. 13, 2008.
Sharif, et al., "On the peak-to-average power of OFDM signals based on oversampling", IEEE Transactions on communications, vol. 51, No. 1, Jan. 2003.
Baxley, et al., "Ordered phase sequence testing in SLM for improved blind detection", Proc. 2005 IEEE Conf on Signal Processing Advances in Wireless Communication.
Schurgers, et al., "A systematic approach to peak-to-average power ratio in OFDM", Proc. SPIE vol. 4474, p. 454 (2001).
Fischer, et al., "Signal shaping for peak-power and dynamics reduction in transmission schemes employing preceding", IEEE Trans. on Comm., v50, pp. 735-741, May 2002.
Jiang, et al., "Two novel nonlinear companding schemes with iterative receiver to reduce PAPR in multi-carrier modulation systems", IEEE Transaction on Broadcasting, vol. 52, pp. 268-273, Jun. 2006.
Jafari, "Adaptive lattice reduction in MIMO systems", Thesis, University of Waterloo, Canada, 2008.
Pise, et al., "Packet forwarding with multiprotocol label switching" World Academy of Science,Engineering and Technology 12 2005.
Boccardi, et al., "The p-sphere encoder: vector precoding with low peak-power for the MIMO Gaussian Broadcast channel", IEEE Trans. Comm., vol. 54, p. 1703, Sep. 2006.
Devlin, et al., "Gaussian pulse based tone reservation for reducing PAPR of OFDM signals", 2007 IEEE Vehicular Technol. Conf.
Rajbanshi, et al., "OFDM symbol design for peak-to-average power ratio reduction employing non-data bearing subcarriers", Proc. 2008 IEEE Wireless Communications and Networking Conference, pp. 554-558.
Zhao, "Distortion-based crest factor reduction algorithms in multi-carrier transmission systems", A Dissertation, Georgia Institute of Technology, Dec. 2007.
Rajbanshi, "OFDM-based cognitive radio for DSA networks", Technical Report, The University of Kansas (2007).
Sari, "OFDM peak power reduction techniques performance analysis for WiMAX Systems" Sequans communications, 4th Annual Wireless Broadband Forum (2005).
Lee et al., "Novel low-complexity SLM schemes for PAPR reduction in OFDM systems", Proc. 2008 IEEE Global Telecommunications Conf GLOBECOM 2008.
Jimenez et al., "Study and Implementation of complementary Golay sequences for PAR reduction in OFDM signals", Proc. 11th Med. Electrotech. Conf. MELECON 2002, pp. 198-203.
Choi, et al., "Peak power reduction scheme based on subcarrier scrambling for MC-CDMA systems", IEE Proceedings on Communications, vol. 151, pp. 39-43, Feb. 2004.
"Peak-to-average power ratio (PAPR)", Wireless Inf. Trans. System Lab., Mar. 2, 2006.
Wang, "PAPR reduction for OFDM", circa 2007.
Giannopoulos, et al., "Relationship among BER, power consumption and PAPR", 2008 IEEE Int. Symp on Wireless Pervasive Computing, pp. 633-637.
Inderjeet Kaur, et al., "The Minimum PAPR Code for OFDM Systems", World Academy of Science, Engineering and Technology 46 2008 p. 285.
O. Daoud, et al., "PAPR Reduction by Linear Coding Techniques for MIMO-OFDM Systems Performance Improvement: Simulation and Hardware Implementation", European Journal of Scientific Research, vol. 36 No. 3 (2009), pp. 376-393.
Ting-Jung Liang et al., "Synchronization in OFDM-based WLAN with Transmit and Receive Diversities", in IEEE 16th Intl. Symp. on Personal, Indoor and Mobile Radio Comm., PIMRC 2005., vol. 2, Sep. 11-14, 2005, pp. 740-744.

* cited by examiner

SYSTEM AND METHOD FOR COMMUNICATING USING BANDWIDTH ON DEMAND

CROSS REFERENCE TO RELATED APPLICATIONS

The present application is a Division of U.S. patent application Ser. No. 13/669,026, filed Nov. 5, 2012, issued Jul. 22, 2014 as U.S. Pat. No. 8,787,873, which claims benefit of priority from U.S. Provisional Patent Application Ser. No. 61/555,585, filed Nov. 4, 2011, which are expressly incorporated herein by reference in their entirety.

FIELD OF THE INVENTION

This invention relates to the field of wireless communications of radio-frequency signals. More specifically, it relates to communications systems and methods which provide bandwidth in excess of that available in a single normal communication channel to a receiver.

BACKGROUND OF THE INVENTION

It is known to "bond" multiple communication channels together to provide increased data bandwidth. For example, ISDN supports aggregating data in multiple "B" (bearer) channels into a composite stream. Likewise, h.320 videoconferencing coordinates multiple ISDN channels.

Similarly, it is known to aggregate bandwidth in multiple channels within an IEEE-802.11g (called "super-g" or "turbo-g", for nominal 108 or 125 megabits per second communications, instead of the normal peak 54 megabits per second available for a single channel), or 802.11n or 802.11ac communication for even higher data rates.

An issue arises when communicating multiple modulated data streams through a common amplifier. Each modulated signal has a peak to average power ratio. The lower the ratio, the more efficiently the power amplifier of the transmitter can operate, and, given legal or practical limits on maximum transmit power, the greater the communication range or bandwidth. When multiple streams are combined, it is possible for the peak signal to double, leading to a requirement for an amplifier having double the peak power, or limiting the power of each component to less than the normal maximum. Therefore, significant inefficiencies may arise when multiple modulated signals are merely summed before the power amplifier, and seeking to sum after the power amplifier also creates problems.

On the other hand, if instead of the multiple modulated signals, a single data stream is provided, backwards compatibility of the system with normal users of the communication channel might be impaired.

Therefore, from a transmit perspective, it is difficult to increase the effective bandwidth of a system by bonding two wireless channels having legacy protocol together, while maintaining efficiency and backwards compatibility.

A common signal format for mobile wireless communications is orthogonal frequency-domain multiplexing, or OFDM, and closely related formats such as orthogonal frequency-domain multiple access (OFDMA). For a signal conveyed on an OFDM channel, this is characterized in the frequency domain by a bundle of narrow adjacent subchannels, and in the time domain by a relatively slow series of OFDM symbols each with a time T, each separated by a guard interval $\Delta T$ (see FIG. 1). Within the guard interval before each symbol is a cyclic prefix (CP), comprised of the same signal in the symbol period, cyclically shifted in time. This CP is designed to reduce the sensitivity of the received signal to precise time synchronization in the presence of multipath, i.e., radio-frequency signals reflecting from large objects in the terrain such as tall buildings, hills, etc. If a given symbol is received with a slight time delay (less than $\Delta T$), it will still be received without error. In addition to the data symbols associated with the OFDM "payload", there is also typically a "preamble" signal that establishes timing and other standards. The preamble may have its own CP, not shown in FIG. 1.

In OFDM, the sub-carrier frequencies are chosen so that the sub-carriers are orthogonal to each other, meaning that cross-talk between the sub-channels is eliminated and inter-sub-carrier guard bands are not required. This greatly simplifies the design of both the transmitter and the receiver; unlike conventional FDM, a separate filter for each sub-channel is not required. The orthogonality requires that the sub-carrier spacing is $\Delta f = k/(T_U)$ Hertz, where $T_U$ seconds is the useful symbol duration (the receiver side window size), and k is a positive integer, typically equal to 1. Therefore, with N sub-carriers, the total passband bandwidth will be $B \approx N \cdot \Delta f$ (Hz). The orthogonality also allows high spectral efficiency, with a total symbol rate near the Nyquist rate. Almost the whole available frequency band can be utilized. OFDM generally has a nearly "white" spectrum, giving it benign electromagnetic interference properties with respect to other co-channel users.

When two OFDM signals are combined, the result is in general a non-orthogonal signal. While a receiver limited to the band of a single OFDM signal would be generally unaffected by the out-of-channel signals, when such signals pass through a common power amplifier, there is an interaction, due to the inherent nonlinearities of the analog system components.

OFDM requires very accurate frequency synchronization between the receiver and the transmitter; with frequency deviation the sub-carriers will no longer be orthogonal, causing intercarrier interference (ICI), i.e. cross-talk between the sub-carriers. Frequency offsets are typically caused by mismatched transmitter and receiver oscillators, or by Doppler shift due to movement. While Doppler shift alone may be compensated for by the receiver, the situation is worsened when combined with multipath, as reflections will appear at various frequency offsets, which is much harder to correct.

The orthogonality allows for efficient modulator and demodulator implementation using the fast Fourier transform (FFT) algorithm on the receiver side, and inverse FFT (IFFT) on the sender side. While the FFT algorithm is relatively efficient, it has modest computational complexity which may be a limiting factor.

One key principle of OFDM is that since low symbol rate modulation schemes (i.e. where the symbols are relatively long compared to the channel time characteristics) suffer less from intersymbol interference caused by multipath propagation, it is advantageous to transmit a number of low-rate streams in parallel instead of a single high-rate stream. Since the duration of each symbol is long, it is feasible to insert a guard interval between the OFDM symbols, thus eliminating the intersymbol interference. The guard interval also eliminates the need for a pulse-shaping filter, and it reduces the sensitivity to time synchronization problems.

The cyclic prefix, which is transmitted during the guard interval, consists of the end of the OFDM symbol copied into the guard interval, and the guard interval is transmitted followed by the OFDM symbol. The reason that the guard interval consists of a copy of the end of the OFDM symbol is so that the receiver will integrate over an integer number of sinusoid cycles for each of the multipaths when it performs OFDM demodulation with the FFT.

The effects of frequency-selective channel conditions, for example fading caused by multipath propagation, can be considered as constant (flat) over an OFDM sub-channel if the sub-channel is sufficiently narrow-banded, i.e. if the number of sub-channels is sufficiently large. This makes equalization far simpler at the receiver in OFDM in comparison to conventional single-carrier modulation. The equalizer only has to multiply each detected sub-carrier (each Fourier coefficient) by a constant complex number, or a rarely changed value. Therefore, receivers are generally tolerant of such modifications of the signal, without requiring that explicit information be transmitted.

OFDM is invariably used in conjunction with channel coding (forward error correction), and almost always uses frequency and/or time interleaving. Frequency (subcarrier) interleaving increases resistance to frequency-selective channel conditions such as fading. For example, when a part of the channel bandwidth is faded, frequency interleaving ensures that the bit errors that would result from those subcarriers in the faded part of the bandwidth are spread out in the bit-stream rather than being concentrated. Similarly, time interleaving ensures that bits that are originally close together in the bit-stream are transmitted far apart in time, thus mitigating against severe fading as would happen when travelling at high speed. Therefore, similarly to equalization per se, a receiver is typically tolerant to some degree of modifications of this type, without increasing the resulting error rate.

The OFDM signal is generated from the digital baseband data by an inverse (fast) Fourier transform (IFFT), which is computationally complex, and as will be discussed below, generates a resulting signal having a relatively high peak to average power ratio (PAPR) for a set including a full range of symbols. This high PAPR, in turn generally leads to increased acquisition costs and operating costs for the power amplifier (PA), and typically a larger non-linear distortion as compared to systems designed for signals having a lower PAPR. This non-linearity leads, among other things, to clipping distortion and intermodulation (IM) distortion, which have the effect of dissipating power, causing out of band interference, and possibly causing in-band interference with a corresponding increase in bit error rate (BER) at a receiver.

In a traditional type OFDM transmitter, a signal generator performs error correction encoding, interleaving, and symbol mapping on an input information bit sequence to produce transmission symbols. The transmission symbols are subjected to serial-to-parallel conversion at the serial-to-parallel (S/P) converter and converted into multiple parallel signal sequences. The S/P converted signal is subjected to inverse fast Fourier transform at IFFF unit. The signal is further subjected to parallel-to-serial conversion at the parallel-to-serial (P/S) converter, and converted into a signal sequence. Then, guard intervals are added by the guard interval (GI) adding unit. The formatted signal is then up-converted to a radio frequency, amplified at the power amplifier, and finally transmitted as an OFDM signal by a radio antenna.

On the other hand, in a traditional type of the OFDM receiver, the radio frequency signal is down-converted to baseband or an intermediate frequency, and the guard interval is removed from the received signal at the guard interval removing unit. Then, the received signal is subjected to serial-to-parallel conversion at S/P converter, fast Fourier transform at the fast Fourier transform (FFT) unit, and parallel-to-serial conversion at P/S converter. Then, the decoded bit sequence is output.

It is conventional for each OFDM channel to have its own transmit chain, ending in a power amplifier (PA) and an antenna element. However, in some cases, one may wish to transmit two or more separate OFDM channels using the same PA and antenna, as shown in FIG. 2. This may permit a system with additional communications bandwidth on a limited number of base-station towers. Given the drive for both additional users and additional data rate, this is highly desirable. The two channels may be combined at an intermediate frequency using a two-stage up-conversion process as shown in FIG. 2. Although amplification of real baseband signals is shown in FIG. 2, in general one has complex two-phase signals with in-phase and quadrature up-conversion (not shown). FIG. 2 also does not show the boundary between digital and analog signals. The baseband signals are normally digital, while the RF transmit signal is normally analog, with digital-to-analog conversion somewhere between these stages.

Consider two similar channels, each with average power $P_0$ and maximum instantaneous power $P_1$. This corresponds to a peak-to-average power ratio PAPR=$P_1/P_0$, usually expressed in dB as PAPR[dB]=10 log($P_1/P_0$). For the combined signal, the average power is 2 $P_0$ (an increase of 3 dB), but the maximum instantaneous power can be as high as 4 $P_1$, an increase of 6 dB. Thus, PAPR for the combined signal can increase by as much as 3 dB. This maximum power will occur if the signals from the two channels happen to have peaks which are in phase. This may be a rare transient occurrence, but in general the linear dynamic range of all transmit components must be designed for this possibility. Nonlinearities will create intermodulation products, which will degrade the signal and cause it to spread into undesirable regions of the spectrum. This, in turn, may require filtering, and in any case will likely reduce the power efficiency of the system.

Components with required increases in linear dynamic range to handle this higher PAPR include digital-to-analog converters, for example, which must have a larger number of effective bits to handle a larger dynamic range. But even more important is the power amplifier (PA), since the PA is generally the largest and most power-intensive component in the transmitter. While it is sometimes possible to maintain components with extra dynamic range that is used only a small fraction of the time, this is wasteful and inefficient, and to be avoided where possible. An amplifier with a larger dynamic range typically costs more than one with a lower dynamic range, and often has a higher quiescent current drain and lower efficiency for comparable inputs and outputs.

This problem of the peak-to-average power ratio (PAPR) is a well-known general problem in OFDM and related waveforms, since they are constructed of multiple closely-spaced subchannels. There are a number of classic strategies to reducing the PAPR, which are addressed in such review articles as "Directions and Recent Advances in PAPR Reduction Methods", Hanna Bogucka, Proc. 2006 IEEE International Symposium on Signal Processing and Information Technology, pp. 821-827, incorporated herein by reference. These PAPR reduction strategies include amplitude clipping and filtering, coding, tone reservation, tone injection, active constellation extension, and multiple signal representation techniques such as partial transmit sequence (PTS), selective mapping (SLM), and interleaving. These techniques can achieve significant PAPR reduction, but at the expense of transmit signal power increase, bit error rate (BER) increase, data rate loss, increase in computational complexity, and so on. Further, many of these techniques require the transmission of additional side-information (about the signal transformation) together with the signal itself, in order that the received signal be properly decoded. Such side-information reduces the generality of the technique, particularly for a technology where one would like simple mobile receivers to receive signals from a variety of base-station transmitters. To the extent compatible, the techniques disclosed in Bogucka, and otherwise known in the art, can be used in conjunction with the techniques discussed herein-below.

Various efforts to solve the PAPR (Peak to Average Power Ratio) issue in an OFDM transmission scheme, include a frequency domain interleaving method, a clipping filtering method (See, for example, X. Li and L. J. Cimini, "Effects of Clipping and Filtering on the Performance of OFDM", IEEE Commun. Lett., Vol. 2, No. 5, pp. 131-133, May, 1998), a partial transmit sequence (PTS) method (See, for example, L. J Cimini and N. R. Sollenberger, "Peak-to-Average Power Ratio Reduction of an OFDM Signal Using Partial Transmit Sequences", IEEE Commun. Lett., Vol. 4, No. 3, pp. 86-88, March, 2000), and a cyclic shift sequence (CSS) method (See, for example, G. Hill and M. Faulkner, "Cyclic Shifting and Time Inversion of Partial Transmit Sequences to Reduce the Peak-to-Average Ratio in OFDM", PIMRC 2000, Vol. 2, pp. 1256-1259, September 2000). In addition, to improve the receiving characteristic in OFDM transmission when a non-linear transmission amplifier is used, a PTS method using a minimum clipping power loss scheme (MCPLS) is proposed to minimize the power loss clipped by a transmission amplifier (See, for example, Xia Lei, Youxi Tang, Shaoqian Li, "A Minimum Clipping Power Loss Scheme for Mitigating the Clipping Noise in OFDM", GLOBECOM 2003, IEEE, Vol. 1, pp. 6-9, December 2003). The MCPLS is also applicable to a cyclic shifting sequence (CSS) method.

In a partial transmit sequence (PTS) scheme, an appropriate set of phase rotation values determined for the respective subcarriers in advance is selected from multiple sets, and the selected set of phase rotations is used to rotate the phase of each of the subcarriers before signal modulation in order to reduce the peak to average power ratio (See, for example, S. H. Muller and J. B. Huber, "A Novel Peak Power Reduction Scheme for OFDM", Proc. of PIMRC '97, pp. 1090-1094, 1997; and G. R. Hill, Faulkner, and J. Singh, "Deducing the Peak-to-Average Power Ratio in OFDM by Cyclically Shifting Partial Transmit Sequences", Electronics Letters, Vol. 36, No. 6, 16 Mar., 2000).

What is needed is a practical method and associated apparatus for reducing the PAPR of combined OFDM signals, in a way that does not degrade the received signal or require the transmission of side-information.

The following patents, each of which are expressly incorporated herein by reference, relate to peak power ratio considerations: U.S. Pat. Nos. 7,535,950; 7,499,496; 7,496,028; 7,467,338; 7,463,698; 7,443,904; 7,376,202; 7,376,074; 7,349,817; 7,345,990; 7,342,978; 7,340,006; 7,321,629; 7,315,580; 7,292,639; 7,002,904; 6,925,128; 7,535,950; 7,499,496; 7,496,028; 7,467,338; 7,443,904; 7,376,074; 7,349,817; 7,345,990; 7,342,978; 7,340,006; 7,339,884; 7,321,629; 7,315,580; 7,301,891; 7,292,639; 7,002,904; 6,925,128; 5,302,914; 20100142475; 20100124294; 20100002800; 20090303868; 20090238064; 20090147870; 20090135949; 20090110034; 20090110033; 20090097579; 20090086848; 20090080500; 20090074093; 20090067318; 20090060073; 20090060070; 20090052577; 20090052561; 20090046702; 20090034407; 20090016464; 20090011722; 20090003308; 20080310383; 20080298490; 20080285673; 20080285432; 20080267312; 20080232235; 20080112496; 20080049602; 20080008084; 20070291860; 20070223365; 20070217329; 20070189334; 20070140367; 20070121483; 20070098094; 20070092017; 20070089015; 20070076588; 20070019537; 20060268672; 20060247898; 20060245346; 20060215732; 20060126748; 20060120269; 20060120268; 20060115010; 20060098747; 20060078066; 20050270968; 20050265468; 20050238110; 20050100108; 20050089116; and 20050089109.

See, also, each of which is expressly incorporated herein by reference:

VIJAYARANGAN, ET AL., "An overview of techniques for reducing peak to average power ratio and its selection criteria for orthogonal frequency division multiplexing radio systems", Journal of Theoretical and Applied Information Technology, vol 5, no. 5 (February 2009).

HUSSAIN, ET AL., "Tone reservation's complexity reduction using fast calculation of maximal IDFT element", IEEE, IWCMC 08, Greece (2008)

ZHAO, ET AL., "A study on the PAPR reduction by hybrid algorithm based on the PTS and GS technique", The Journal of the Korean Institute of Communication Sciences, Vol. 31, No. 2A, p. 187, February 2006.

MARSALEK, "On the reduced complexity interleaving method for OFDM PAPR reduction", Radioengineering, vol. 1, no 3, September 2006

WU, ET AL., "8 B/10 B Codec for efficient PAPR reduction in OFDM communication systems", IEEE Int'l Conf on Wireless Communications, Networking and Mobile Computing (WCNMC), Jun. 13-16, 2005, Maui, Hi., USA.

HUSSEIN, ET AL., "Performance enhancement of STBC OFDM-CDMA system using channel coding techniques over multipath fading channel", Journal of Theoretical and Applied Information Technology, Vol. 5, No. 5, pp. 591-601, June, 2009.

MULLER, ET AL., "OFDM with reduced peak-to-average power ratio by multiple signal representation", Annals of Telecommunications, vol. 52, no 1-2, pp. 58-67, February 1997

MOBASHER, ET AL., "Integer-based constellation shaping method for PAPR reduction in OFDM systems", IEEE Transactions on Communications, vol. 54, pp. 119-126, January 2006.

DEUMAL, ET AL., "Peak reduction of multi-carrier systems by controlled spectral outgrowth", Proc. IEEE Intl. Conf. on Acoustics, Speech and Signal Processing (ICASSP), 2006.

WEN, ET AL., "The PAPR reduction in OFDM system with the help of signal mapping scheme", International Journal of Applied Science and Engineering 2007, 5, 1: 75-80

SOHN, "RBF neural network based SLM peak-to-average power ratio reduction in OFDM systems, ETRI Journal, Volume 29, Number 3, June 2007

SATHANANTHAN, ET AL., "Reducing intercarrier interference in OFDM systems by partial transmit sequence and selected mapping", Proc. Int'l. Symp. on DSP for Comm. Systems, 2002.

TSENG, ET AL., "A reduced-complexity PTS scheme for peak-to-average power ratio reduction in OFDM systems", Proc. European Society for Signal Processing (EURASIP) 2008.

BEHRAVAN, ET AL., "Iterative estimation and cancellation of nonlinear distortion in OFDM systems", www.mantracom.com/downloads Jun. 19, 2008

VIJAYARANGAN, ET AL., "Reducing peak to average power ratio in orthogonal frequency division multiplexing using modified peak factor mapping", IE(I) Journal-ET (February, 2008)

PRADABPET, ET AL., "A new PAPR reduction in OFDM systems using PTS combined with APPR for TWTA nonlinear HPA", Songklanakarin J. Sci. Technol. 30 (3), 355-360, May-June 2008

MATEJKA, "DRM PAPR distribution and its relation to classical AM power amplifier", www.urel.feec.vutbr.cz/ra2008/archive/ra2003/papers/169.pdf, Radioelektronika 2003

DE FIGUEIREDO, "Adaptive pre-distorters for linearization of high power amplifiers in OFDM wireless communications", IEEE North Jersey Section CASS/EDS Chapter, Distinguished lecture TAHA, "Performance analysis of ICC technique for OFDM PAPR reduction and its application over BTC, Master's degree project, Stockholm, Sweden 2006

JAYALATH, ET AL., "On the PAR reduction of OFDM signals using multiple signal representation", IEEE Communications Letters, vol. 8, no. 7, July 2004

ANDGART, ET AL., "Designing Tone Reservation PAR reduction", EURASIP Journal on applied Signal Processing, vol 2006, article ID 38237, pages 1-14

SIEGL, ET AL., "Partial transmit sequences for Peak-to-average power ratio reduction in multiantenna OFDM", EURASIP Journal on Wireless Communications and Networking, vol. 2008, article ID 325829, 11 pages WEN, ET AL., "A sub-optimal PTS algorithm based on particle swarm optimization technique for PAPR reduction in OFDM systems", EURASIP J. Wireless Commun. and Networking (January 2008).

DENG, ET AL., "OFDM PAPR reduction using clipping with distortion control", Proc. 2005 IEEE Conf. on Communications.

LIN, ET AL., "Selective-mapping type peak power reduction techniques for turbo coded OFDM", 2005 International Conference on Wireless Networks, Communications and Mobile Computing AL-KEBSI, ET AL., "Throughput enhancement and performance improvement of the OFDM based WLAN system", IJCSNS International Journal of Computer Science and Network Security, vol. 9, no. 4, April 2009

GIANNOPOULOS, ET AL., "Novel efficient weighting factors for PTS-based PAPR reduction in low-power OFDM transmitters", www.eurasip.org/proceedings/Eusipco/Eusipco2006/papers/1568982220 2006

WULICH, ET AL., "Is PAPR reduction always justified for OFDM?", Proc. European Wireless Conference, 2007.

WESOLOWSKI, "On the PAPR minimization using selected mapping algorithm in pilot-assisted OFDM systems", Proc. European Wireless Conference, 2007.

ALHARBI, ET AL., "A combined SLM and closed-loop QO-STBC for PAPR mitigation in MIMO-OFDM transmission". www.eurasip.org/proceedings/Eusipco2008/papers/1569102063 2008

YANG, ET AL., "Selective vector perturbation precoding and peak to average power ratio reduction of OFDM systems", Proc. IEEE Global Telecommunications Conf., 2008.

TSAI, ET AL., "A tail-biting turbo coded OFDM system for PAPR and BER reduction", 2007 IEEE Vehicular Technology Conference.

BAXLEY, "Analyzing selected mapping for peak-to-average power reduction in OFDM", Thesis, School of Electrical and Computer Engineering, Georgia Institute of Technology, May 2005

WANG, "Peak to average power ratio reduction for OFDM", Research & Standards LGE Mobile Research, USA, Aug. 27, 2007, 3GPP2, TSG-C NTAH.

PARK, ET AL., "Tone reservation method for PAPR reduction scheme", IEEE 802.16e-03/60

BREILING, ET AL., "SLM peak-power reduction without explicit side information", IEEE Communications Letters, vol. 5, no. 6, June 2001

GUEL, ET AL., "Approximation of the average power variation for geometric adding signal approach of PAPR reduction in context of OFDM signals", Union Radio Scientifique Internationale-URSI, Aug. 7-16, 2008, Chicago, Ill.

HUSSAIN, ET AL., "Peak to average power ratio reduction for multi-band OFDM system using tone reservation", www.ursi-test.intec.ugent.be/files/URSIGA08/papers/CPS2p5 2008

VALBONESI, ET AL., "Low-complexity method for PAPR reduction in OFDM based on frame expansion parameter selection", $13^{th}$ European Signal Processing Conference, Sep. 4-8, 2005, Antalya, Turkey BREILING, ET AL., "Distortionless reduction of peak power without explicit side information", 2000 IEEE Global Telecommunications Conference.

JAYALATH, ET AL., "Use of data permutation to reduce the peak-to-average power ratio of an OFDM signal", Wireless Communications and Mobile Computing, 2002, 2:187-203

JAYALATH, ET AL., "On the PAR reduction of OFDM signals using multiple signal representation", IEEE communications Letters, vol. 8, no. 7, July 2004

JAYALATH, ET AL., "SLM and PTS peak-power reduction of OFDM signals without side information", IEEE Trans. on Wireless Communications, vol. 4, no. 5, September 2005

VEERAGANDHAM, "Orthogonal frequency division multiplexing" EECS 865:Wireless Communications FISCHER, ET AL., "Directed selected mapping for peak-to-average power ratio reduction in MIMO OFDM", Proc. International OFDM Workshop, 2007.

FISCHER, "Widely-linear selected mapping for peak-to-average power ratio reduction in OFDM", Electronics Letters, vol. 43, 2007.

WANG, "Reduction of the PAPR in OFDM signals by applying PTS mechanism", Master Thesis, Institute of Communication Engineering, Tatung University, January 2004

LIN, "Performance analysis in the PAPR of OFDM system via SLM scheme", Master Thesis, Institute of Communication Engineering, Tatung University, January 2004

RAJBANSHI, ET AL., "Peak-to-average power ratio analysis for NC-OFDM transmissions", Proc. 2007 IEEE Vehicular Technology Conference.

SAITO, ET AL., "PAPR reduction of MC-CDMA signals by selected mapping with interleavers", Multi-Carrier Spread-Spectrum, Springer Netherlands, pp. 453-460

HABENDORF, ET AL., "Nonlinear predistortion with reduced peak-to-average power ratio", Proc. International Symposium on Wireless Communications.

HOSSEINI, ET AL., "PAPR reduction in OFDM systems using polynomial-based compressing and iterative expanding", 2006 IEEE ICASSP.

FISCHER, ET AL., "Peak-to-average power ratio reduction in MIMO OFDM", Proc. 2007 Int. Conf on Communications, pp. 762-767.

RAGUSA, ET AL., "Invertible clipping for increasing the power efficiency of OFDM amplification", Proc. 2007 IEEE Int. Symposium on Personal Indoor and Mobile Radio Communications.

SEZGINER, ET AL., "Metric-based symbol predistortion techniques for peak power reduction in OFDM systems", IEEE Trans. on Wireless Communications, vol. 6, no. 7, July 2007

SIEGL, ET AL., "Peak-to-average power ratio reduction in multi-user OFDM", Proc. 2007 IEEE Int. Symp. on Information Theory.

HENKEL, ET AL., "Partial transmit sequences and trellis shaping", Proc. 5th Int. ITC Conf. on Source and Channel Coding, 2004.

LEE, ET AL., "Unitary peak power reduction for short packet communications in multiple transmit antennas", IEEE Trans. Commun., vol. 56, February 2008, pp. 234-244.

LOYKA, ET AL., "On the peak factor of sampled and continuous signals", Proc. 2006 IEEE Vehicular Technology Conf.

LIN, ET AL., "Selective-mapping type peak power reduction techniques for turbo coded OFDM", 2005 IEEE Conf. on Wireless Networks, Communications and Mobile Computing.

BONACCORSO, ET AL., "Reducing the peak to average power ratio in OFDM systems", Dix-septieme colloque-GRETSI, Vannes, 13-17 Sep. 1999

BAXLEY, ET AL., "Assessing peak-to-average power ratios for communications applications", Proc. IEEE Military Communications Conf (MILCOM 2004).

CHEN, ET AL., "A modified selective mapping with PAPR reduction and error correction in OFDM systems", 2007 IEEE Wireless Com. and Networking Conf., pp. 1329-1333.

FISCHER, "Peak-to-average power ratio (PAR) reduction in OFDM based on lattice decoding", Proc. Int. OFDM Workshop.

SIEGL, ET AL., "Directed selected mapping for peak-to-average power ratio reduction in single-antenna OFDM", Proc. Int. OFDM Workshop.

CIOCHINA, ET AL., "An analysis of OFDM peak power reduction techniques for WiMAX systems', Proc. 2006 Int. Conf on Communications, pp. 4676-4681.

MALKIN, ET AL., "Dynamic allocation of reserved tones for PAR reduction", OFDM Workshop, August 2008, Hamburg Germany PRADABPET, ET AL., "A new PTS method using GA for PAPR reduction in OFDM-WLAN 802.11a systems", www.jcsse.org/slide/comp_int/P0014.pdf WU, ET AL., "Peak-to-average power ratio reduction in OFDM based on transformation of partial transmit sequences", Electronics Letters, Jan. 19, 2006, vol. 42, no. 2

HAIDER, "Peak to average ratio reduction in wireless OFDM communication systems", Thesis, Blekinge Institute of Technology, January 2006

HENKEL, ET AL., "Another application for trellis shaping: PAR reduction for DMT (OFDM), IEEE Transactions on Communications, vol. 48, no. 9, September 2000

FISCHER, ET AL., "Peak-to-average power ratio reduction in single- and multi-antenna OFDM via directed selected mapping", Jul. 19, 2007

HERRAIZ, "Multicarrier communication systems with low sensitivity to nonlinear amplification", Thesis, Eng. i Arquitectura La Salle, Univers. Ramon Llull, Barcelona 2008

KASIRI, ET AL., "A preprocessing method for PAPR reduction in OFDM systems by modifying FFT and IFFT matrices", The 18th Annual IEEE International Symposium on Personal, Indoor and Mobile Radio Communications (PIMRC'07)

MALKIN, ET AL., "Optimal constellation distortion for PAR reduction in OFDM systems", Proc. 2008 PIMRC.

WEI, ET AL., "A modern extreme value theory approach to calculating the distribution of the peak-to-average power ratio in OFDM systems", 2002 IEEE Int. Conf. on Communications, vol. 3, pp. 1686-1690.

RAJBANSHI, ET AL., "Adaptive-mode peak-to-average power ratio reduction algorithm for OFDM-based cognitive radio", 2006 IEEE Vehicular Technology Conf.

REN, "An improved selected mapping scheme for PAPR reduction in OFDM systems", Thesis, University of Cincinnati SOHN, "RBF neural network based SLM peak-to-average power ratio reduction in OFDM systems", ETRI Journal, vol. 29, no. 3, June 2007

BOONSRIMUANG, ET AL., "Mitigation of non-linear distortion using PTS and IDAR method for multi-level QAM-OFDM system", ECTI Transactions on Computer and Information Technology, vol. 1, no. 2, November 2005.

SCHENK, ET AL., "The application of spatial shifting for peak-to-average power ratio reduction in MIMO OFDM systems", Proc. 2006 IEEE Vehicular Technol. Conf.

SCHENK, ET AL., "Peak-to-average power reduction in space division multiplexing based OFDM systems through spatial shifting", Electronics Letters, Jul. 21, 2005, vol. 41, no. 15

NAWAZ, ET AL., "PAPR reduction technique for OFDM systems with rotated MPSK constellations and coordinate interleaving", Proc. 2008 IEEE Symp on Comm. & Veh. Technol.

VAN WELDEN, ET AL., "Clipping versus symbol switching for PAPR reduction in coded OFDM", $15^{th}$ Annual Symposium of the IEEE/CVT Benelux Chapter, Nov. 13, 2008

SHARIF, ET AL., "On the peak-to-average power of OFDM signals based on oversampling", IEEE Transactions on Communications, vol. 51, no. 1, January 2003

BAXLEY, ET AL., "Ordered phase sequence testing in SLM for improved blind detection", Proc. 2005 IEEE Conf on Signal Processing Advances in Wireless Communication.

SCHURGERS, ET AL., "A systematic approach to peak-to-average power ratio in OFDM", Proc. SPIE vol 4474, p. 454 (2001).

FISCHER, ET AL., "Signal shaping for peak-power and dynamics reduction in transmission schemes employing precoding", IEEE Trans. on Comm., v50, pp. 735-741, May 2002.

JIANG, ET AL., "Two novel nonlinear companding schemes with iterative receiver to reduce PAPR in multicarrier modulation systems", IEEE Transaction on Broadcasting, vol. 52, pp. 268-273, June 2006.

JAFARI, "Adaptive lattice reduction in MIMO systems", Thesis, University of Waterloo, Canada, 2008

PISE, ET AL., "Packet forwarding with multiprotocol label switching" World Academy of Science, Engineering and Technology 12 2005

BOCCARDI, ET AL., "The p-sphere encoder: vector precoding with low peak-power for the MIMO Gaussian Broadcast Channel", IEEE Trans. Comm., vol. 54, p. 1703, September 2006.

DEVLIN, ET AL., "Gaussian pulse based tone reservation for reducing PAPR of OFDM signals", 2007 IEEE Vehicular Technol. Conf.

RAJBANSHI, ET AL., "OFDM symbol design for peak-to-average power ratio reduction employing non-data bearing subcarriers", Proc. 2008 IEEE Wireless Communications and Networking Conference, pp. 554-558.

ZHAO, "Distortion-based crest factor reduction algorithms in multi-carrier transmission systems", A Dissertation, Georgia Institute of Technology, December 2007

RAJBANSHI, "OFDM-based cognitive radio for DSA networks", Technical Report, The University of Kansas (2007).

SARI, "OFDM peak power reduction techniques performance analysis for WiMAX Systems" Sequans Communications, 4th Annual Wireless Broadband Forum (2005).

Lee et al., "Novel low-complexity SLM schemes for PAPR reduction in OFDM systems", Proc. 2008 IEEE Global Telecommunications Conf GLOBECOM 2008.

Jimenez et al., "Study and Implementation of complementary Golay sequences for PAR reduction in OFDM signals", Proc. 11th Med. Electrotech. Conf. MELECON 2002, pp. 198-203.

CHOI, ET AL., "Peak power reduction scheme based on subcarrier scrambling for MC-CDMA systems", IEE Proceedings on Communications, vol. 151, pp. 39-43, February 2004.

"Peak-to-average power ratio (PAPR)", Wireless Inf. Trans. System Lab., Mar. 2, 2006

WANG, "PAPR reduction for OFDM", circa 2007.

GIANNOPOULOS, ET AL., "Relationship among BER, power consumption and PAPR", 2008 IEEE Int. Symp on Wireless Pervasive Computing, pp. 633-637.

INDERJEET KAUR, et al., "The Minimum PAPR Code for OFDM Systems", World Academy of Science, Engineering and Technology 46 2008 p. 285.

O. DAOUD, et al., "PAPR Reduction by Linear Coding Techniques for MIMO-OFDM Systems Performance Improvement: Simulation and Hardware Implementation", European Journal of Scientific Research, Vol. 36 No. 3 (2009), pp 376-393.

Ting-Jung Liang et al., "Synchronization in OFDM-based WLAN with Transmit and Receive Diversities", in IEEE 16th Intl. Symp. on Personal, Indoor and Mobile Radio Comm., PIMRC 2005., vol. 2, 11-14 Sep. 2005, pp. 740-744.

SUMMARY OF THE INVENTION

The world today is about smart connectivity. Smartphones, tablets, netbooks, and computers form a key component in the connected world. Smart connectivity hinges on the concept of "any-time; any-where", a means by which users can access content across various sources on the go. Mobile network operators (MNO) play a vital role in advancement of smart connectivity. MNOs provide the bridge between the content and the device, and hence, in many countries they also act as key point-of-sale for the distribution of the mobile devices like Smartphones, Tablets etc. The devices usually come with a data plan that is tied to the monthly fee paid by the subscriber. Data plans are usually fixed and capped to a limit, though some operators do provide an all-you-can-consume data plan. Such data plans are not flexible, and do not provide any ability of the user to change the plan dynamically. Moreover, most data plans do not specify the speed at which the data is delivered. Applications like video and gaming not only require huge data, they also require them to the delivered fast, i.e. delivered at a higher data rate. Data plans today do not require you to specify any minimum throughput at which the data is delivered. Data delivery is taken care by the quality-of-service (QoS) parameters and it is very difficult for the subscriber to change the QoS dynamically, or to change the throughput. With this invention we provide a method for the subscriber to dynamically change the QoS and hence move to a higher throughput as mandated and required by the subscriber or device.

An embodiment of the present technology, called Bandwidth-on-Demand (BoD), enables the subscriber of the mobile device to dynamically switch (or be switched) to higher bandwidth and to enable a higher throughput, which may be for a fixed period of time. For example, upon expiry of that period, the device reverts to its original throughput, as per the subscriber's plan.

See, e.g., U.S. Pat. No. 7,643,489, U.S. Pat. No. 6,738,348, and U.S. Pat. No. 5,828,737, each of which is expressly incorporated herein by reference.

Yieh-Ran Haung; Yi-Bing Lin; "A bandwidth-on-demand strategy for GPRS", IEEE Trans. Wireless Communications, (July 2005), 4(4):1394-1399, expressly incorporated herein by reference, discusses that General packet radio service (GPRS) is a global system for mobile communications (GSM) packet data service. It proposes that, in order to efficiently accommodate GPRS traffic while maintaining the desired service quality of GSM calls, a GPRS BoD bandwidth-allocation strategy, adaptive to the change of traffic conditions, and thus dynamically adjusting the number of channels for GSM and GPRS traffic be employed.

Cisco Turbo Boost for Mobile Broadband, www.cisco.com/en/US/solutions/collateral/ns341/ns973/ns1081/brochure_c02-620391.html, suggests that subscribers sometimes want the ability to upgrade the performance of certain high-bandwidth applications for a specific time period, and that operators can gain additional revenue by offering users the ability to turbo-boost application performance on demand. For example, the mobile operator might detect that a subscriber to its lowest-tier pricing plan is playing an online gaming application. During the session, the operator offers the user the ability to increase available bandwidth for the remainder of the gaming session, and the user, who really wants to win the game, accepts the additional charge for the Turbo Boost. Optionally, operators might also expose a network API for over-the-top (OTT) application providers who can bundle in an operator network-enabled "turbo boost" capability in their bandwidth-intensive services, to ensure a satisfactory user experience while sharing revenue with the operator. The feature provides subscribers the opportunity to purchase on-demand upgrades to quality of service (QoS) when accessing specific high-bandwidth applications. The feature allows users to dynamically improve performance of an application at the time of its usage, and permits business models for application providers to embed the turbo boost capability into their services on an as-needed burst basis to ensure quality of the user experience. Cisco proposes that this would gain new revenues from users upgrading QoS on demand for applications of their choice. For example, an operator could offer a user playing a massively multiplayer online (MMO) game or watching a streaming high-definition video a bandwidth speed upgrade for the session; creating higher uptake rate for service upgrades when offered dynamically "in service". It also provides an exposed API for OTT application providers, increasing operator's partnership revenue opportunities. The feature is delivered using the Cisco® ASR 5000, and utilizes several In-line Services functions such as Enhanced Charging Service, Application Detection and Control, Traffic Optimization, and Policy Enforcement. It may be used in conjunction with Cisco Mobility Unified Reporting, to provide statistical analysis and trending information of network attributes and subscriber sessions, using deep packet inspection (DPI) capabilities of the Cisco ASR 5000 and the Cisco Policy and Charging Control (PCC), to enable users to choose to upgrade quality of service dynamically, or in the case of bundled capability, enables application providers to activate it as network conditions dictate.

See also, US Patent and Patent Application Nos., each of which is expressly incorporated herein by reference in its entirety: Ser. Nos. 09/735,675; 09/771,036; 09/778,999; 09/800,267; 09/811,566; 09/818,723; 09/829,360; 09/844,075; 09/849,623; 09/858,387; 09/858,956; 09/887,906; 09/930,827; 09/963,352; 10/142,267; 10/167,401; 10/177,741; 10/246,957; 10/247,084; 10/426,037; 10/644,676; 10/754,866; 10/764,196; 10/898,594; 10/928,584; 11/017,997; 11/033,524; 11/134,136; 11/176,838; 11/279,899; 11/323,788; 11/331,787; 11/338,534; 11/440,531; 11/492,610; 11/570,005; 11/759,762; 11/958,929; 12/144,536; 12/237,151; 12/298,533; 12/329,702; 12/412,790; 12/434,167; 12/441,595; 12/453,170; 12/557,479; 12/592,238; 12/619,334; 12/648,685; 12/661,468; 12/696,760; 12/843,858; 12/915,418; 12/963,484; 12/964,735; 12/996,375; 12/996,563; 13/065,038; 13/126,873; 2003/0236087; U.S. Pat. Nos. 5,642,155; 5,721,815; 5,745,480; 5,790,549; 5,828,737; 5,936,949; 5,956,337; 5,970,068; 6,006,069; 6,016,311; 6,028,843; 6,061,562; 6,088,335; 6,101,174; 6,112,056; 6,230,005; 6,240,274; 6,246,713; 6,307,836; 6,363,074; 6,370,391; 6,377,561; 6,381,289; 6,556,820; 6,661,781; 6,683,866; 6,693,887; 6,741,575; 6,757,268; 6,769,089; 6,771,660; 6,785,252; 6,804,521; 6,842,437; 6,847,633; 6,850,732; 6,912,393; 6,956,834; 6,963,730; 6,985,455; 7,016,375; 7,020,472; 7,106,781; 7,119,614; 7,1302,83; 7,133,395; 7,190,683; 7,218,936; 7,293,223; 7,299,064; 7,443,814; 7,486,639; 7,529,193; 7,548,529; 7,656,845; 7,672309; 7,684,807; 7,809,403; 7,860,076; 7,899,463; 7,916,816; 7,925,211; 8,027,298; Re. 42,225; Re. 42,788.

For example, the following initiators can activate bandwidth-on-demand:

1. Device initiated bandwidth-on-demand: The device monitors initiates bandwidth-on-demand by monitoring the use of the device. Examples of which are:

a. Tethering: The device detects that it is used as an access point or a modem. Upon detecting this mode, the device initiates bandwidth-on-demand.

b. Uploading of data: The device detects that the subscriber is uploading a large data, and triggers bandwidth-on-demand for a fixed period of time.

c. Extension of the plan: The device monitors the consumed data rate, and initiates bandwidth-on-demand till the end of the current billing period.

2. Operator initiated bandwidth-on-demand: The operator, as a part of a marketing effort, or to market new services, provides the device a better data rate. This can be done by designating the subscriber's data as "gold" and enabling better QoS for the user's data for a fixed period of time. Additionally, the user can also be allocated a higher number of data blocks (like more resource elements, and resource blocks, time slots, or subcarriers).

3. Application driven bandwidth-on-demand: Applications, commonly termed as apps, when launched, detect the current data rate, and initiate a bandwidth-on-demand. Examples of these are:

a. Live video/event streaming applications showing the latest sport event b. Video-on-Demand (VoD) applications like Hulu. These applications when launched, detect the current data rate of the user, determine the optimal data rate, and initiate a bandwidth-on-demand for the period of the video. These applications can also present the subscriber a choice for viewing the content in a high definition mode with a guaranteed rate, or in standard definition mode, where the data rate might not be optimal and the quality is not guaranteed.

c. Interactive gaming applications. Gaming applications determine the minimum QoS requirements, and initiate a bandwidth-on-demand in order to meet the experience requirements for interactive gaming.

4. Sponsored bandwidth-on-demand: Sponsors and advertisements can sponsor additional throughput for a fixed period of time. Sponsorship can be tied within applications like live video/event streaming, VoD applications, gaming.

5. Ask-Bid bandwidth-on-demand: The network based on the current state of the network, provides options to the subscriber to bid for a higher throughput for a fixed period of time. The subscriber bids for a certain throughput rate, and the winning user is guaranteed the rate for a fixed period of time, or amount of data, or other limit or quantity.

6. Subscriber initiated bandwidth-on-demand: The subscriber initiates a bandwidth-on-demand request, either for a fixed throughput, a fixed duration or a fixed amount.

Bandwidth-on-Demand Steps

Upon initiation, the process works as follows:

1. The initiator activates bandwidth-on-demand.

2. The device using the appropriate messaging protocol as per the standard (for e.g. 3GPP LTE, 3GPP LTE-A, HSPA+, WCDMA, EV-DO, CDMA 2000) contacts the policy servers of the MNO.

3. The policy server contacts the Authentication, Authorization and Accounting (AAA) server in the MNO's core network.

4. The AAA server examines the BoD request, examines the credentials of the subscriber by contacting the billing server, and determines if the request can be granted.

a. If the request can be granted, the AAA server contacts the policy server.

b. The policy server contacts the scheduler on the serving basestation, which then determines to whether to allocate more resources (i.e. bandwidth in the form of subcarriers, resource blocks, resource elements, timeslots) to the user. This will be measured as an increase in throughput for the user.

c. This action is communicated to the device, which initiates a timer or a data rate counter depending on the granted request.

5. If the AAA server determines that BoD cannot be granted to the subscriber, either due to the current state of the network, or the subscriber's credentials, the server notifies the policy server which then notifies the served device.

6. When either the determined time or the amount of data consumed is exhausted, the AAA server initiates the following actions:

a. It contacts the policy server.

b. The policy server drops the user to the original plan and initiates appropriate actions with the scheduler of the serving base station.

Models for Bandwidth-on-Demand

Initiating bandwidth-on-demand successfully will result in increased throughput for the subscriber. Each initiator can have a certain model (e.g. fixed duration, as decided by the application, or bill/cost). The following table summarizes the models under which bandwidth-on-demand can be delivered:

TABLE 1

| Initiator | Type |
|---|---|
| Device initiated BoD | |
| Tethering | 1. Fixed duration |
| | 2. Cost |
| Uploading of data | 1. Fixed duration |
| Extension of the plan | 1. Fixed duration till the next billing cycle |
| Operator initiated BoD | 1. Fixed duration |
| Application driven BoD | |
| Live event/video streaming | 1. Fixed Duration |
| Video-on-Demand | 1. Fixed Duration |
| Interactive Gaming | 1. Cost |
| | 2. Until activity terminates |
| Sponsored BoD | 1. Price |
| | 2. Fixed Duration |
| Ask-Bid BoD | 1. Fixed Duration |
| Subscriber initiated BoD | 1. Fixed Duration |
| | 2. Price |
| | 3. Until user terminates |
| Variable Pricing | 1. Price for what is consumed |

Measurement of Bandwidth-on-Demand

Dynamic bandwidth-on-demand allocation results in an increase of throughput. The throughput increase can be either duration based, cost/price based. The following methods can be used to measure the throughput (determined over a period of time):

1. Average throughput
2. Min-Max measured throughput
3. Standard Deviation of the throughput (with respect to the mean)
4. Median throughput Pricing for Bandwidth-on-Demand Bandwidth-on-demand presents opportunities for several parties. The operator can monetize the investments in new technology effectively, and can price services based on demand. Operators are now presented with a means to market products that require small bursts of bandwidth. It also presents a means for sponsors to play a role in the data plans, and enable effective product placements during events. App (application) developers, game developers and content distribution networks can attractively price products based on the throughput requirements, and can initiate BoD for delivering these products.

Effective Bandwidth-on-Demand

Bandwidth-on-Demand is a dynamic demand management idea, for current MNOs. BoD can be used within the current network architectures. Nevertheless, there is a potential for further gains by pairing BoD with the Shift and Add algorithm described below. The shift-and-add algorithm enables an operator to combine spectrum effectively, and to provide higher data rates with existing infrastructure. If the MNO has deployed shift-and-add, then the operator can effectively schedule BoD subscribers on the other frequency carrier, thereby effectively freeing up the main frequency carrier to handle other subscribers.

Another aspect of the present technology provides a system which digitally formats data in a plurality of bands, each band being separately formed as a modulated signal, which are then transmitted using a common broadband power amplifier. The modulated signals are, for example OFDM modulated, though the modulation scheme may be different, and indeed the modulation scheme of the respective modulated signals may differ. A technique is used, for example, to ensure that the power peaks of the respective modulated signals are not aligned in time, thus reducing the PAPR, for example through a transform which maintains the information communication capacity of the band, maintains compatibility with legacy equipment users of the respective band. The modulated signals are coordinated to communicate portions of a single communication, effectively providing a higher bandwidth communication.

Thus, at the transmitter, a digital processor divides a digital data stream between the various digital modulators. Typically, the data processor and digital modulators are not responsive to the various data codes and their possible modulated representations and resultant PAPR. However, in some embodiments, the digital processor is coordinated to produce signals which convey the information stream, but avoid simultaneous high power peaks in the various modulated signals, or provide complementary peaks which destructively interfere.

In a particular embodiment, the modulated signals are digitally processed after up-conversion, and shifted in time sufficient to avoid constructive interference of power peaks, in a manner compatible with the communications protocol.

At the receiver, typically a multiple concurrent band radio is employed, which captures the plurality of modulated signals through a single antenna, low noise amplifier, downconverter, and digitizer, and the digitized wideband signal is then digitally processed to extract and decode the multiple modulated signals. Of course, it is also possible to demodulate the modulated signals with a plurality of radios.

Typically, the bands containing the modulated signals will be near each other, e.g., within 100 MHz, and perhaps spaced 5, 10 or 20 MHz apart. In some cases, adjacent bands are licensed to different parties, but may be transmitted from a common tower, e.g., cell site. The licensees (carriers) may employ different standards and protocols. One aspect of the present system permits various carriers to "borrow" bandwidth from each other, or permits users to aggregate bandwidth from multiple carriers, without creating incompatibilities.

When multiple radio signals with different carrier frequencies are combined for transmission, this combined signal typically has an increased peak-to-average power ratio (PAPR), owing to the possibility of in-phase combining of peaks, requiring a larger radio-frequency power amplifier (PA) operating at low average efficiency. The PAPR for digital combinations of orthogonal frequency-domain multiplexed (OFDM) channels may be reduced by storing the time-domain OFDM signals for a given symbol period in a memory buffer, and carrying out cyclic time shifts of at least one OFDM signal, in order to select the time-shift corresponding to reduced PAPR of the combined multi-channel signal. This may be applied to signals either at baseband, or on upconverted signals. Simulations show that several decibels reduction in PAPR can be obtained without degrading system performance. No side information needs to be transmitted to the receiver.

A preferred embodiment of the present system and method seeks to control the PAPR by storing the time-domain OFDM signals for a given symbol period in a memory buffer, and carrying out cyclic time shifts of at least one of the OFDM signals, in order to select the time-shift corresponding to a desired PAPR of the combined multi-channel signal. In most cases, it would be desired to reduce the PAPR to a minimum, but this is not a limitation of the technique, and the selected time-shift may be based on other criteria.

It is noted that each of the OFDM signals may be preprocessed in accordance with known schemes, and thus each may have been themselves processed to reduce an intrinsic PAPR, though preferably any preprocessing of the signals is coordinated with the processing of the combined signals to achieve an optimum cost and benefit. For example, where two separate signals are to be combined, each having a high PAPR, a resulting signal of reduced PAPR can be achieved if the peaks add out of phase, and thus cancel. Therefore, initial uncoordinated efforts to modify the input OFDM signals may have limited benefit.

It is noted that the present system seeks to combine independently formatted OFDM, which are generally targeted to different receivers or sets of receivers, and these sets are typically not coordinated with each other. For example, in a cellular transceiver system, a base station may serve hundreds or thousands of cell phones, each phone monitoring a single OFDM broadcast channel, with the base station servicing multiple OFDM channels. It is particularly noted that each set of OFDM subcarriers is orthogonal, but the separate OFDM signals, and their subcarriers, are generally not orthogonal with each other. The OFDM signals may be in channels which are adjacent or displaced, and therefore a relative phase change between OFDM signals can occur during a single symbol period. Therefore, the PAPR must be considered over the entire symbol period.

Indeed, according to another embodiment of the method, it is not the PAPR of the signal which is analyzed for optimization, but rather an inferred error at the receiver. This, if the PAPR of the composite signal is high for only a small portion of a symbol period, such that the PA distorts or clips the signal at that time, but at most other times the combined signals are well within specification, the result may be an acceptable transmission which would likely result in a low error probability. Indeed, in some cases, the error probability may be lower than for signals with a lower absolute peak. Therefore, by employing a model of a receiver, which itself may include margins for specific communication channel impairments to specific receivers, and Doppler shifts (which may be determined, for example by analyzing return path characteristics), or over a range of possible variation, as part of the transmitter signal processing path, better performance may be available than by simply minimizing the PAPR.

Another option is to modify the OFDM signal during all or a portion of the period in a manner which deviates from a standard protocol, which is, for example an IEEE-802 OFDM standard, WiFi, WiMax, DAB, DVB, cellular communication, LTE signal, or the like, but which does not substantively increase a predicted BER of a standard or specific receiver. For example, if the PAPR is high for a small portion a symbol period, such that if during a portion of the symbol period, one or more subcarriers were eliminated or modified, the PAPR would be acceptable, and the signal at the receiver would have sufficient information to be decoded using a standard receiver without significant increase in BER, then the transmitter could implement such modifications without need to transmit side information identifying the modifications which necessary for demodulation. Another possible deviation is, for example, to frequency shift the signal (which mildly violates the orthogonality criterion), within the tolerance of a receiver to operate within a range of Doppler shifts which are equivalent to frequency shifts.

Consider two OFDM signals that are being combined as in FIG. 2. For simplicity, call Signal 1 (S1) the reference signal, and Signal 2 (S2) the modified signal. During each OFDM symbol period, the baseband digital data bits for each signal will be stored in memory. Assume that the Preamble has been stripped off, but the Cyclic Prefix CP remains. As indicated in FIG. 3 for one embodiment of the invention, the bits for the reference signal S1 are stored in a first-in-first-out (FIFO) shift register (SR). The corresponding bits for the modified signal S2 are stored in a circular shift register (CSR), so configured that the data contained can be rotated under program control. The data for both signals are first up-converted to an intermediate frequency (IF) and then combined (added), while maintaining digital format at a sampling frequency increased over the digital data rate. The combined IF signals are then subjected to a PAPR test, to determine whether the peak power level is acceptable, or, in other embodiments, whether other criteria are met. This might correspond, for example, to a PAPR of 9 dB. If the test is passed, then the data bits for the combined OFDM symbols are read out, to be subsequently reassembled into the full OFDM frame and up-converted to the full RF, for further amplification in the PA and transmission. According to another embodiment, a combined OFDM representation of the combined data is itself the source for the up-conversion.

More generally, once the parametric transformation (relative time-shift) to achieve the desired criteria is determined, the final signal is then formulated dependent on that parameter or a resulting representation, which may be the digital data bits of the baseband signal or a converted form thereof; in the latter case, the system may implement a series of transformations on the data, some of which are redundant or failed, seeking an acceptable one or optimum one; once that is found, it may not be necessary to repeat the series or transformations again. Likewise, the option of reverting to the original digital data and repeating the determined series of transformations allows a somewhat different representation to be formed in the register, for example one which is simplified or predistorted to allow consideration of analog component performance issues in the combining test.

Even more generally, the technique provides that each signal to be combined is provided with a range of one or more acceptable parameters, which may vary incrementally, algorithmically, randomly, or otherwise, and at least a portion of the possible combinations tested and/or analyzed for conformity with one or more criteria, and thereafter the combination of OFDM signals implemented using the selected parameter(s) from a larger set of available parameters. This parametric variation and testing may be performed with high speed digital circuits, such as superconducting logic, in a serial fashion, or slower logic with parallelization as necessary, though other technologies may be employed as appropriate and/or necessary, including but not limited to optical computers, programmable logic arrays, massively parallel computers (e.g., graphic processors, such as nVidia Tesla® GPU, ATI Radeon R66, R700), and the like. The use of superconducting digital circuits may be advantageous, for example, where a large number of complex computations which make significant use of a specialized high speed processor, such as where a large number of independent receivers are modeled as part of a transmitter optimization.

In the preferred embodiment, at any state of the tests over the parametric range, if the test is not passed, a control signal is fed back to the register, e.g., CSR, which rotates the data bits of the modified signal S2. The shifted data is then combined with the initial stored data from S1 as before, and the PAPR re-tested. This is repeated until the PAPR test is passed. A similar sequence of steps is illustrated in FIG. 4, where stripping off the preamble and reattaching it at the end are explicitly shown. It is noted that, in some cases, the tests may be applied in parallel, and therefore a strictly iterative test is not required. This, in turn, permits use of lower speed testing logic, albeit of higher complexity. Likewise, at each relative time-shift, a secondary parameter may also be considered.

For example, a secondary consideration for optimal combining may be in-band (non-filterable) intermodulation distortion. Thus, at each basic parametric variation, the predicted in-band intermodulation distortion, expressed, for example, as a power and/or inferred BER, may be calculated. This consideration may be merged with the PAPR, for example, by imposing a threshold or optimizing a simple linear combination "cost function", within an acceptable PAPR range.

While there may be some delays in this Shift-and-Add process (SAA), the time for the entire decision algorithm, including all iterations, must not exceed the expanded symbol time T+ΔT. We have described a serial decision process in FIGS. 3 and 4. As discussed, above, in some cases, it may be preferable to carry out parts of this process in parallel, using multiple CSRs with different shifts and multiple parallel PAPR tests, in order to complete the process more quickly. This is illustrated in FIG. 5, which suggests parallel memories (shown here as RAMs), each with an appropriate time shift, where the minimum PAPR is selected to send to the RF subsystem. The optimum tradeoff between circuit speed and complexity will determine the preferred configuration.

In some situations, the search for an optimum combined signal requires vast computational resources. In fact, heuristics may be available to limit the search while still achieving an acceptable result. In the case of a PAPR optimization, generally the goal is to test for limited, low probability "worst case" combinations of symbols. If the raw digital data is available, a lookup table may be employed to test for bad combinations, which can then be addressed according to a predetermined modification. However, for multi-way combinations of complex symbols this lookup table may be infeasible. On the other hand, the individual OFDM waveforms may each be searched for peaks, for example 6 dB above mean, and only these portions of the signal analyzed to determine whether there is a temporal alignment with the peaks of other OFDM signals; if the peaks are not temporally synchronized, then a presumption is made that an unacceptable peak will not result in the final combined signal. This method makes a presumption that should be statistically acceptable, that is, that only portions of an OFDM waveform that are themselves relative peaks will contribute to large peaks in the combination of OFDM signals. This method avoids serial testing of sequential parametric variations, and rather simply avoids worst case superpositions of a binary threshold condition.

It is important to note that the circularly shifted symbol data for the modified signal represents exactly the same set of symbols as the unshifted data. Further, because of the standard properties of OFDM signals, the shifted symbol set can be transmitted and received with no special side-information, and with no degradation of signal integrity. So the combined OFDM channels with reduced PAPR should exhibit essentially the same performance as the original unshifted version. A set of detailed simulations that confirm this are described in the Detailed Description section below.

Although these figures focus on the case of reducing PAPR for the combination of two OFDM channels, this method is not limited to two channels. Three or more channels can be optimized by a similar method of circular time shifts, followed by PAPR tests.

A simplified flowchart for the method of the invention is shown in FIG. 10. The increased bandwidth specified in this flowchart may represent any appropriate increase in Quality of Service. The usage threshold may represent a predetermined level of excess usage, a defined time, or some combination thereof. The time delay associated with periodic re-checking the usage may be a time interval such as one minute, which may also be associated with an appropriate surcharge algorithm. It may also be much faster, enabling more efficient bandwidth utilization by reconfiguring communication channels based on dynamic variations in real-time data requirements.

The block diagram of a mobile wireless communications system employing the BoD method is shown in FIG. 11. Note that the request for an increase in QoS may come from the mobile user, but it may alternatively be initiated automatically by the basestation to maximize overall wireless capacity, or by the Mobile Network Operator (MNO). Note further that the reconfiguration of the QoS may be applied to the mobile transceiver and/or the basestation transceiver, on either the downlink or the uplink.

It is therefore an object to provide a system, computer readable medium storing a nontransitory program for a programmable processor, and method and for dynamically changing the QoS for a user of a cellular radio system, comprising: requesting an increase in quality of service from a normal level; authenticating the request; determining availability of an increased quality of service for the user; initiating the increase in the quality of service for the user of the cellular radio system; metering the usage of the increased quality of service by the user; charging an account for the usage of the increased quality of service by the user; determining a metering threshold; and upon exceeding the metering threshold, reverting the quality of service to the normal level or recommencing at least the metering, charging and determining and reverting or recommencing.

It is another object to provide a processor for dynamically changing the QoS for a user of a cellular radio system, comprising: an input port configured to receive a request for an increase in quality of service from a normal level; at least one processor configured to authenticate the request, define a metering threshold and upon exceeding the metering threshold, to deauthorize the request, and to charge an account for the usage of the increased quality of service by the user; and an output port configured to query a transceiver control server to determine availability of an increased quality of service for the user, and if available to initiate the increase in the quality of service for the user of the cellular radio system and meter the usage of the increased quality of service by the user.

The requesting may be initiated by a user, a cellular carrier, a sponsor, and/or an application program executing on a cellular handset.

The increase in quality of service may comprise an increase in available bandwidth in a communication band, and/or an increase in available bandwidth in a plurality of communication bands.

The determining availability of an increased quality of service for the user may comprise communicating between a central policy server and a cell site server.

The metering may comprise timing a duration of increased quality of service, determining a quantity of data communicated, and/or determining a statistical measure of quality of service.

The charging may comprise charging a predetermined fixed amount for an increment of increased quality of service, a variable amount for an increment of increased quality of service, a competitively determined amount for an increment of increased quality of service, and/or an amount for an increment of increased quality of service determined based on an auction.

The determining a metering threshold may comprise determining expiration of a timer.

The method may, upon exceeding the metering threshold, revert the quality of service to the normal level and/or at recommencing least the metering, charging and determining. It is also an object to provide a method for dynamically adjusting transmission quality, comprising: receiving at least two streams of orthogonal frequency multiplexed symbols for concurrent transmission by a transmitter having a non-linear distortion as a function of signal magnitude; determining, prior to transmission, a plurality of possible superpositions of the at least two streams of symbols with respectively different cyclic time shifts of a respective orthogonal frequency multiplexed symbol, and selecting at least one cyclic time shift which results in a non-linear distortion having acceptable characteristics; and transmitting the at least two streams of orthogonal frequency multiplexed symbols with a selected cyclic time shift having the acceptable characteristics, as a superposed signal through the transmitter having the non-linear distortion as a function of signal magnitude.

DETAILED DESCRIPTION OF THE PREFERRED EMBODIMENTS

The present technology may be implemented by allocation to a user of available bandwidth within a normal communication band, which is typically implemented by instructing the receiver, up to its capacity, to accept communications within the band, which may be designated by timeslots, frames, codes, or the like. This is typically provided by a software "upgrade", without requiring hardware modification. It is noted that in some cases, a cellular handset or other radio has a data rate limit imposed by hardware constraints, less than the full data rate for which a band is capable. Thus, the bandwidth on demand function is typically responsive to the receiver capability, which may differ between a variety of receiver types. On the other hand, full to partial backward compatibility with legacy receivers and protocols is not required, and therefore this is an optional feature.

Another implementation of the technology provides that the bandwidth is derived from multiple bands. In this case, the receiver may employ multiple radios, or a multiband receiver system. Advantageously, a receiver is provided which has broadband capability, and is capable of simultaneously receiving multiple bands within a block, through a single antenna and low noise amplifier, and common down converter. This results in a wideband intermediate frequency (IF) modulated signal, representing a plurality of bands, which may be contiguous or discontiguous. The receiver may then provide various architectures for extracting the information. For example, a single high speed analog to digital converter could be provided to digitize the entire IF, and the representations of the multiple bands within the digitized IF signal then digitally processed to extract the modulated information. On the other hand, the IF may then be further processed by a plurality of tuners, each reducing a respective band to baseband and filtering other bands. This superheterodyne embodiment requires multiple receiving channels, however, the parallel architecture elements operate at relatively low speeds. Alternately, a plurality of subsampling analog to digital converters may separately process the IF signal, to selectively digitize the band of interest, which may then be digitally demodulated.

When a plurality of bands are bonded together to co-transmit a digital data stream, it is advantageous for these bands to be transmitted from a common antenna, and received by a common antenna. Below is described in detail a method and apparatus for increasing the efficiency of the system by reducing the peak to average power ratio of a combined signal, while maintaining compatibility with typical cellular OFDM protocols. In many cases, the efficiency of the power amplifier in the transmitter is a significant factor, and by reducing the PAPR, an amplifier with lower headroom, and thus lower cost, higher efficiency, and/or greater average power may be employed.

Figure 1A:
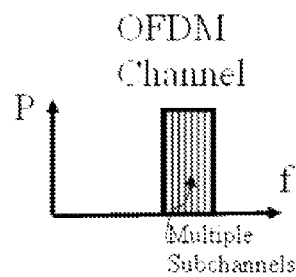
FIGS. 1A and 1B shows typical behavior of an orthogonal frequency-domain multiplexed channel in the frequency and time domains.
Figure 1B:
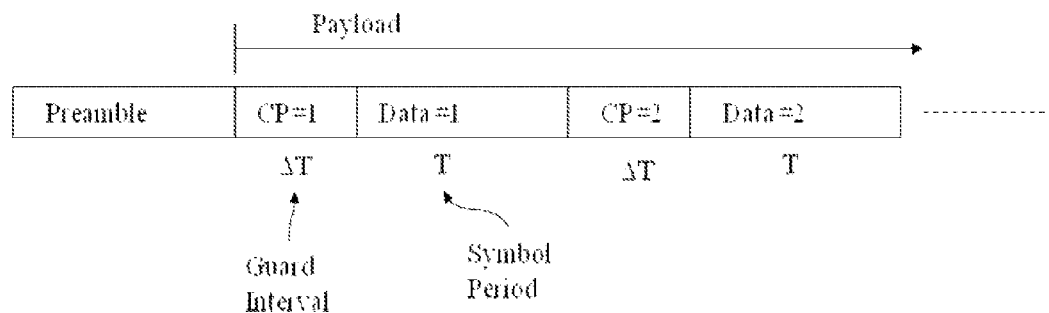
Figure 2:
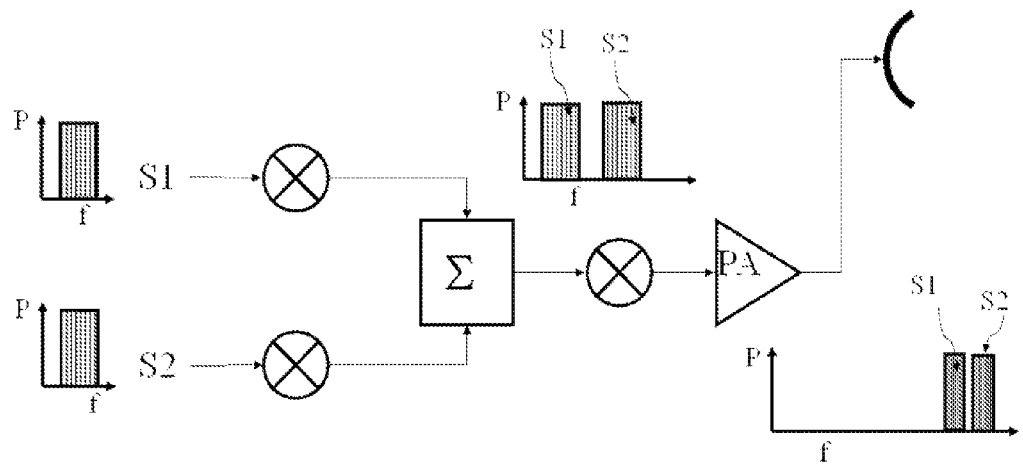
FIG. 2 shows the combination of two OFDM channels in a transmitter using a double-upconversion method.

OFDM channels are comprised of many sub-channels, each of which is a narrow-band signal (FIGS. 1A and 1B). An OFDM channel itself has a time-varying envelope, and may exhibit a substantial PAPR, typically 9-10 dB. However, if two separate similar OFDM channels are combined, the resulting signal will exhibit PAPR of 12-13 dB, for a gain of 3 dB. This is unacceptably large, since it would require a power amplifier with 4 times the capacity to transmit a combined signal that averages only 2 times larger.

A preferred embodiment therefore provides a PAPR reduction method which reduces the PAPR of a two OFDM channel combined signal from 12-13 dB back down to the 9-10 dB of the original components. This ~3 dB reduction in PAPR is preferably accomplished without degradation of the signal, and without the need to transmit any special side information that the receiver would need to recover the OFDM symbols. Further, the algorithm is simple enough that it can be implemented in any hardware technology, as long as it is sufficiently fast.

Conventional methods of PAPR reduction focus on combining the sub-channels and generating a single OFDM channel without excessive PAPR. The present technique can be viewed in certain respects as a combination of Partial Transmit Sequence (PTM) and Selected Mapping (SLM).

In traditional PTS, an input data block of N symbols is partitioned into disjoint sub-blocks. The sub-carriers in each sub-block are weighted by a phase factor for that sub-block. The phase factors are selected such that the PAPR of the combined signal is minimized.

In the SLM technique, the transmitter generates a set of sufficiently different candidate data blocks, all representing the same information as the original data block, and selects the most favorable for transmission (lowest PAPR without signal degradation).

The present hybrid approach combines elements of PTS and SLM for summed carrier modulated signals. The various cyclic time-shifts of the oversampled OFDM waveform are searched, and the time-shift with the lowest PAPR selected. One OFDM signal is used as reference and the other carrier modulated signal(s) are used to generate the time-shifts, in a manner similar to PTS. The search window is determined by the cyclic prefix length and the oversampling rate.

While the phase space of possible combinations of shifts increases tremendously, it would not be necessary to explore all such combinations. In general, very high values of the PAPR occur relatively rarely, so that most time shifts starting with a high-PAPR state would tend to result in a reduction in PAPR. Shifts in multiple channels could be implemented sequentially or in parallel, or in some combination of the two. Thus, for example, any combination with a PAPR within an acceptable range is acceptable, any unacceptable PAPR states occur 1% of the time, the search space to find an acceptable PAPR would generally be <2% of the possible states. On the other hand, if other acceptability criteria are employed, a larger search space may be necessary or appropriate. For example, assuming that there is a higher cost for transmitting a higher PAPR signal, e.g., a power cost or an interference cost, then a formal optimization may be appropriate. Assuming that no heuristic is available for predicting an optimal state, a full search of the parametric space may then be appropriate to minimize the cost.

This differs from conventional approaches, wherein different OFDM channels are independent of one another, with separate transmit chains and without mutual synchronization. Further, the conventional approaches operate directly on the baseband signals. In contrast, the present method evaluates PAPR on an up-converted, combined signal that incorporates two or more OFDM channels, and the symbol periods for each of these channels must be synchronized. This will not cause problems at the receivers, where each channel is received and clocked independently.

Some conventional approaches to PAPR are based on clipping, but these inevitably produce distortion and out-of-band generation. Some other approaches avoid distortion, but require special transformations that must be decoded at the receive end. These either require sending side-information, or involve deviations from the standard OFDM communication protocols. The present preferred approach has neither shortcoming.

OFDM channels used in cellular communications, may be up to 10 or 20 MHz in bandwidth. However, these channels might be located in a much broader frequency band, such as 2.5-2.7 GHz. So one might have a combination of two or more OFDM channels, each 10 MHz wide, separated by 100 MHz or more. A 10 MHz digital baseband signal may be sampled at a rate as low as 20 MS/s, but a combined digital signal covering 100 MHz must be sampled at a rate of at least 200 MS/s.

Figure 3:
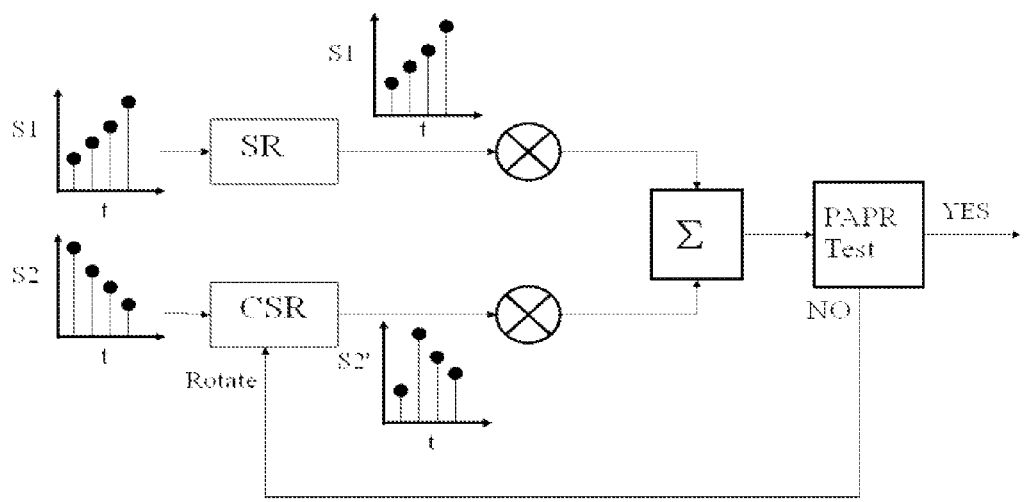
FIG. 3 provides a simple block diagram showing how two OFDM channels may be combined, wherein the data bits of one OFDM channel may be cyclically shifted in order to reduce the peak-to-average power ratio (PAPR).
Figure 4:
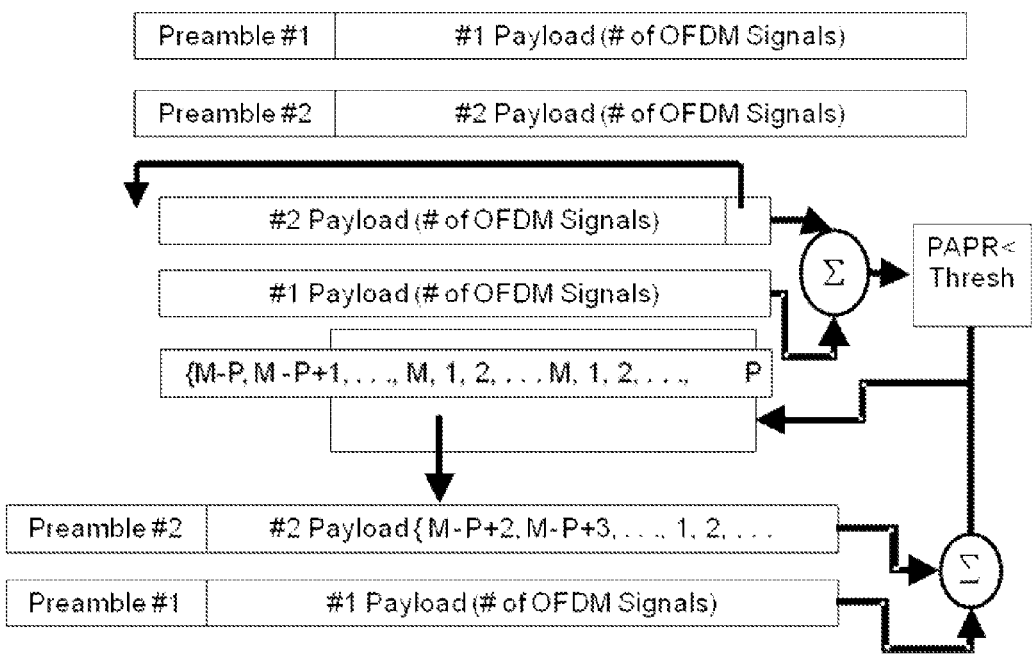
FIG. 4 shows the structure of two OFDM channels, with cyclic shifting of the data for one channel in order to reduce the PAPR.
Figure 5:
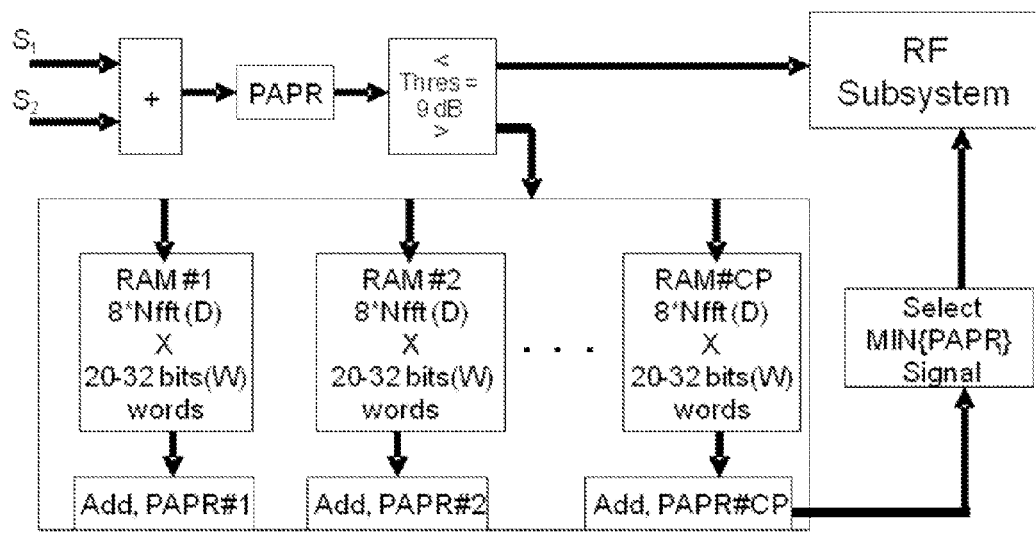
FIG. 5 provides a block diagram showing memory storage of multiple shifted replicas of data from an OFDM channel, with selection of one replica corresponding to minimizing the PAPR.

In a preferred embodiment, the signal combination (including the up-conversion in FIG. 3) is carried out in the digital domain at such an enhanced sampling rate. The PAPR threshold test and CSR control are also implemented at the higher rate. This rate should be fast enough so that multiple iterations can be carried out within a single symbol time (several microseconds).

Figure 6:
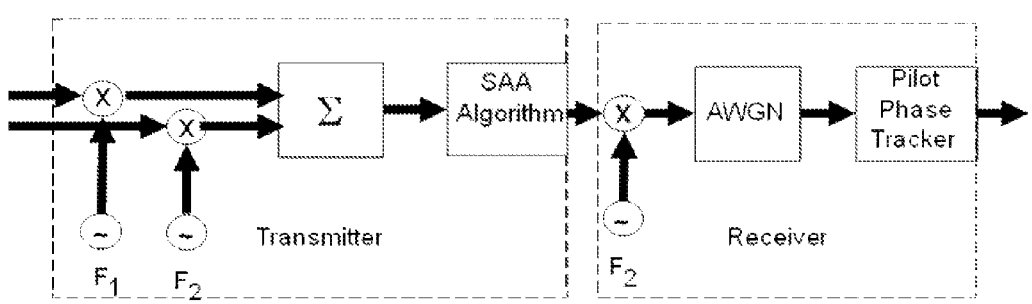
FIG. 6 shows a block diagram of a simulated communication system that incorporates the shift-and-add algorithm in the transmitter.
Figure 7:
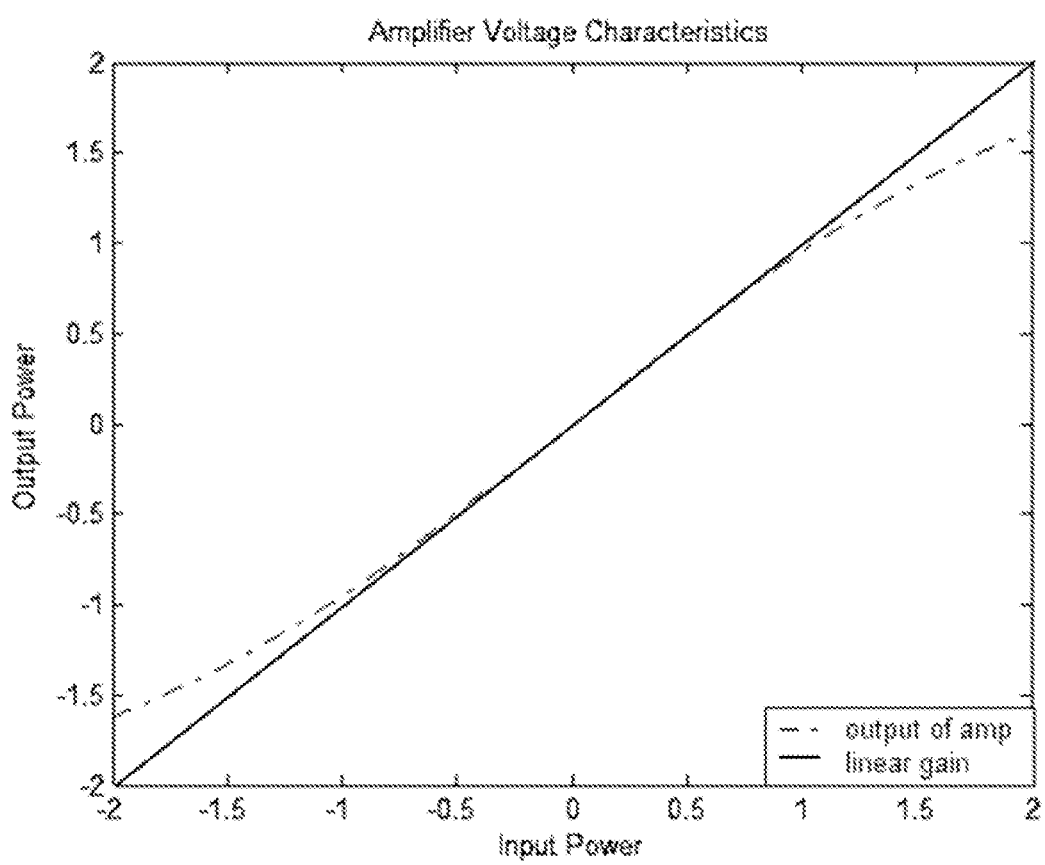
FIG. 7 shows the transfer function of the Power Amplifier included in the transmitter for the simulation shown in FIG. 6.

In order to verify the expectation that the circular time-shift permits reduction in PAPR for combined OFDM channels, without degrading system performance, a full Monte-Carlo simulation of OFDM transmission and reception was carried out. The block diagram of this simulation is summarized in FIG. 6, which represents the "SAA Evaluation Test Bench", and shows a transmitter that combines OFDM signals at frequencies $F_1$ and $F_2$, subject to the SAA algorithm for PAPR reduction. At the receive end, this is down-converted and the signal at $F_2$ is recovered using a standard OFDM receiver. Along the way, appropriate Additive White Gaussian Noise (AWGN) is added to the channel. The simulation also includes a realistic transfer function for an almost-linear Power Amplifier (PA), showing deviation from linearity near saturation (see FIG. 7). The gain factor does not matter for this simulation, so this was not included.

In these simulations, the PAPR of the OFDM signals at F1 and F2 are typically 9-10 dB, and these are then added together to yield a combined signal with a typical PAPR of 12-13 dB. To minimize nonlinear distortion in the transmitted signal, the input power backoff (in dB) for the operation of the transmitter PA is selected to be equal to the PAPR for the combined signal. For each selected value of AWGN, the SNR (in dB) is calculated based on the average powers of the noise and the signal. Then the simulation is run and the bit-error-rate (BER) obtained from the digital signal reconstruction in the OFDM receiver. After application of the SAA, the PAPR is reduced, typically by up to 3 dB, to obtain a modified combined signal with PAPR of 9-10 dB. The input power backoff is then reduced to the new value of the PAPR, and the BER vs. SNR values resimulated.

The parameters for the PAPR bit-error-rate (BER) simulations include the following. Each packet contains 800 bytes of information, which is modulated over several OFDM symbol periods, depending on the modulation type used. Both QPSK (quadrature phase-shift keying) and 16-QAM (16-quadrature amplitude modulation) are examined. Each SNR point is run until 250 packet errors occur. The cyclic prefix is set to ⅛ of the total symbol time. Carriers at frequencies $F_1$ and $F_2$ are spaced sufficiently that their spectra do not overlap. The oversampling rate is a factor of 8. Finally, a raised cosine filter was used, with a very sharp rolloff, with a sampling frequency $F_s$=160 MHz, and a frequency cutoff $F_c$=24 MHz. A PAPR threshold of about 9 dB for the combined OFDM channels was used.

Figure 8:
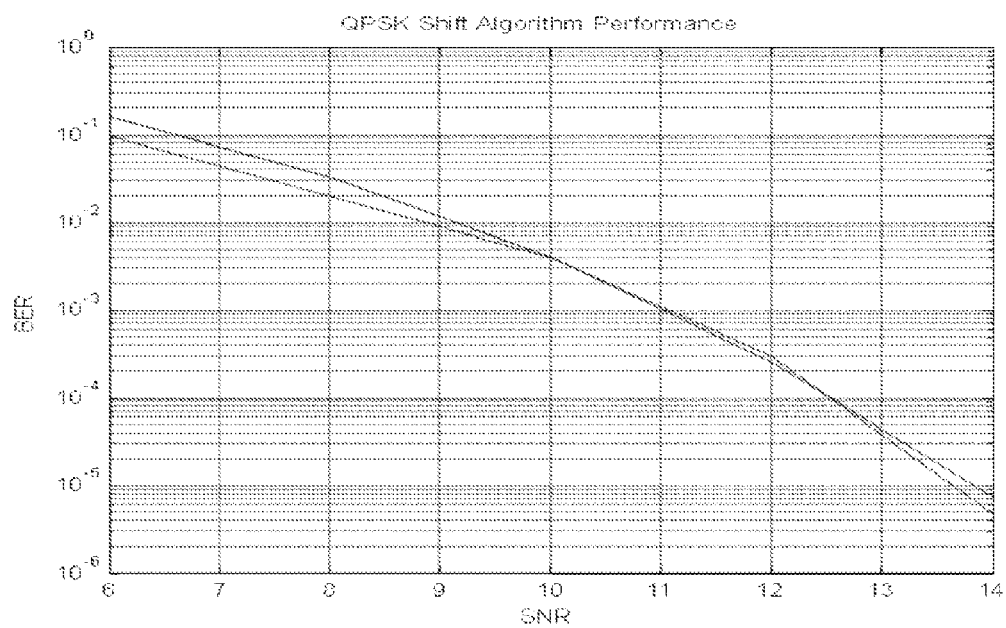
FIG. 8 plots the bit-error rate (BER) for the simulation using quadrature phase-shift keyed (QPSK) OFDM signals, as a function of the signal-to-noise ratio (SNR), with and without the Shift-and-Add algorithm.
Figure 9:
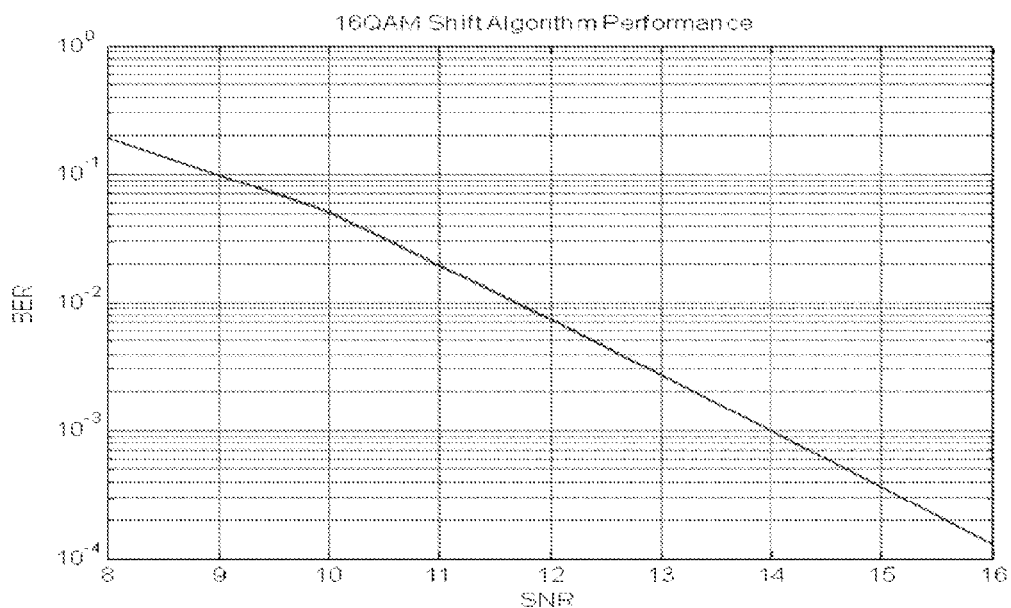
FIG. 9 plots BER using 16-quadrature-amplitude modulated signals (16-QAM) as a function of SNR, with and without the Shift-and-Add algorithm.

FIG. 8 shows the BER performance, as a function signal-to-noise ratio (SNR) (i.e., varying the AWGN power), with and without application of the SAA algorithm, for QPSK modulation. FIG. 9 shows the corresponding analysis for 16-QAM. In both cases, there is very little degradation in BER from zero-shift curves. In FIGS. 8 and 9, the dashed line represents the BER vs. SNR for the combined signal without modification, while the solid line represents the BER vs. SNR for the combined signal after PAPR reduction using SAA. In FIG. 9 for 16QAM, the two lines are virtually indistinguishable. Thus, we have confirmed in these cases that the reduction in PAPR produced by SAA is not accompanied by an increase in signal distortion, and therefore that the SAA improves the system transmission efficiency by the full amount of the PAPR reduction, with no significant degradation in system performance. We further expect similar results (reduction in combined PAPR without signal degradation) to hold for combinations of three or more OFDM signals.

Analyzed quantitatively, the net performance improvement using the SAA is 2.35 dB for QPSK and 2.9 dB for 16-QAM, as inferred from the BER plots. For example, if without SAA, the BER exhibits an error floor of 0.03 at an input backoff (for the PA) of 8.5 dB, whereas the BER exhibits the same error floor with SAA of 6.5 dB, the performance improvement will be 8.5−6.5=2 dB.

These simulations have confirmed not only that the SAA algorithm permits reduction of PAPR in combined OFDM channels by ~3 dB, but also that this reduction is achieved without signal degradation and without the need to send any special side information on the transformations in the transmit signal.

One preferred implementation of the technique involves using a fast field-programmable gate array (FPGA) with blocks for shift-register memories, digital up-conversion, and threshold testing. Alternatively, an ultrafast digital technology, such as rapid-single-flux-quantum (RSFQ) superconducting circuits, may be employed. As the number of OFDM channels being combined is increased, one needs either to increase the algorithm speed, or alternatively carry out a portion of the processing in parallel.

This method may also be applied to a reconfigurable system along the lines of cognitive radio, wherein the channels to be transmitted may be dynamically reassigned depending on user demand and available bandwidth. Both the number of transmitted channels and their frequency allocation may be varied, under full software control. As long as all channels follow the same general symbol protocol and timing, one may apply a similar set of Shift-and-Add algorithms to maintain an acceptable PAPR for efficient transmission.

Figure 10:
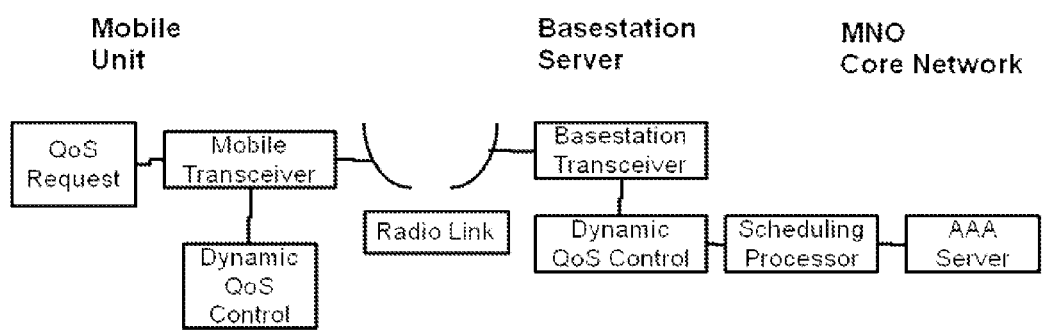
FIG. 10 presents a flowchart for one preferred embodiment of the method for Dynamic Bandwidth-on-Demand.

The method of the present invention is illustrated by the flowchart of FIG. 10. Here the request for a change in bandwidth is initiated, e.g., by the mobile customer. This request is passed along to an appropriate automated server, such as the AAA Server (Authentication, Authorization, and Accounting) of the Mobile Network Operator. This server confirms that the request is authentic, and determines if the additional bandwidth requested is available. If so, the increased bandwidth is initiated, and the additional usage is metered. An appropriate usage threshold is pre-defined, and the cumulative usage is periodically compared to this threshold. This periodic checking may be made on a timescale of one minute, for example, or it may be significantly faster. Once the cumulative usage exceeds the threshold, the increased bandwidth is terminated, reducing the usage rate to the default value. The total surcharge for the increased bandwidth is computed and added to the customer's bill.

Figure 11:
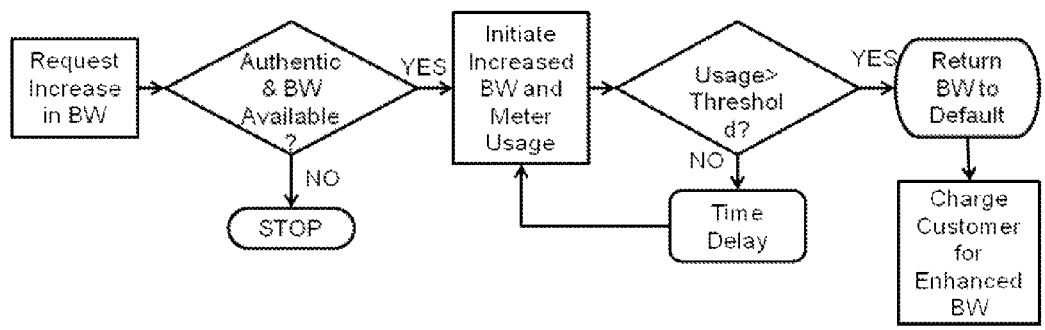
FIG. 11 presents a block diagram of a mobile wireless system employing the Bandwidth-on-Demand method.

A block diagram for a hardware system that may implement the method of FIG. 10 is shown in FIG. 11. This shows a mobile unit linked via a radio connection with a cellular basestation, which in turn is linked to a server in the Core Network of the Mobile Network Operator (MNO). The request for an increase in the Quality of Service may come from the mobile user, and is passed via the mobile transceiver to the basestation and the MNO Core Network. Both the mobile transceiver and the basestation transceiver have dynamic QoS control units, which can be reprogrammed remotely. Both uplink and downlink data communications rates may be adjusted. After the AAA Server in the Core Network authorizes a change, the scheduling processor in the basestation initiates the change in the Dynamic QoS Control Unit of the mobile and/or the basestation transceiver. The Scheduling Processor also keeps track of the cumulative usage, and determines when the QoS enhancement should be terminated. The AAA Server receives the total usage information and computes the customer surcharge.

The example presented in FIG. 11 is one embodiment of a system that may implement the method of the invention, and should not be viewed as limiting.

Hardware Overview

Figure 12:
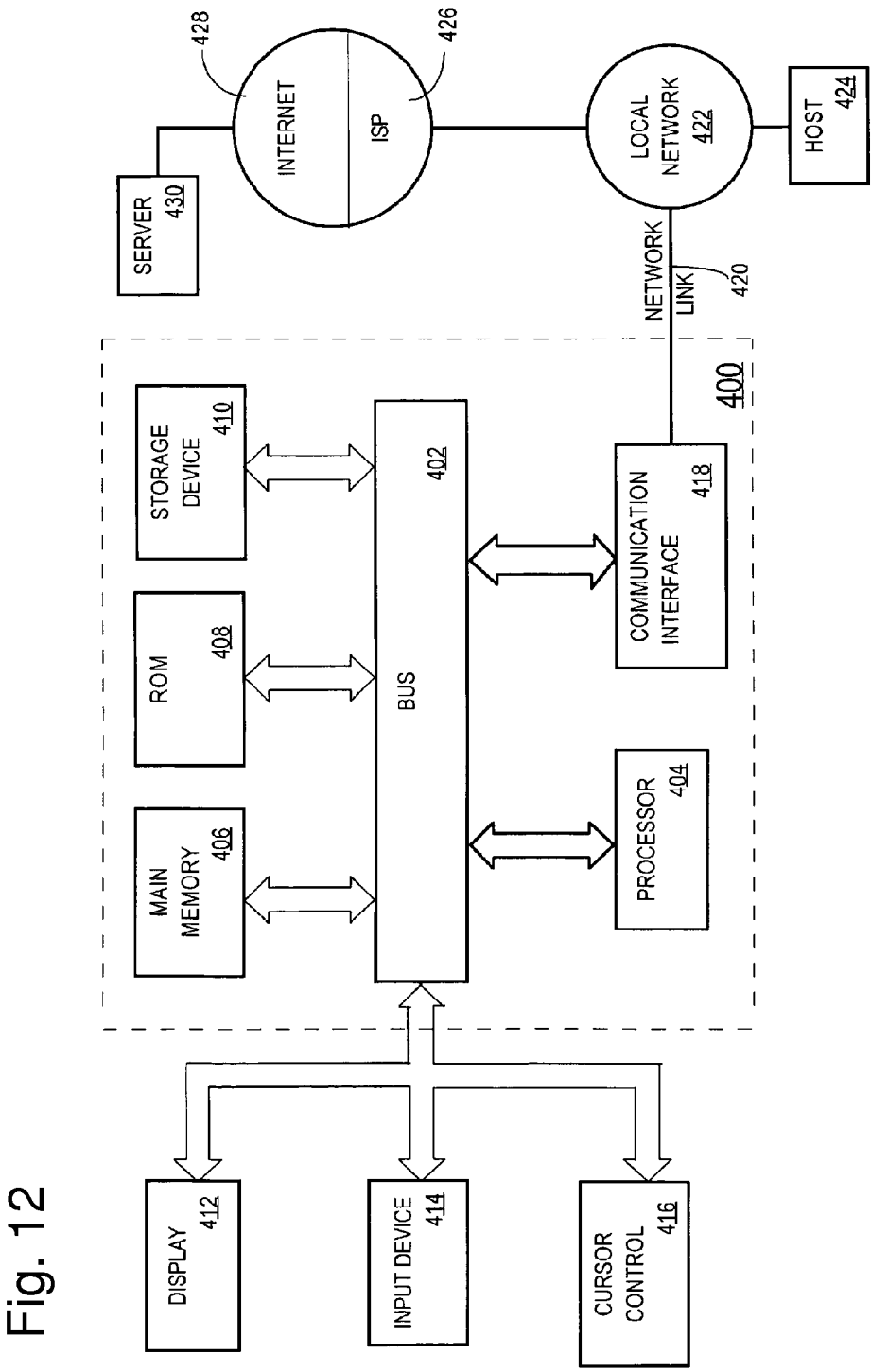
FIG. 12 shows a schematic diagram of a prior art standard type computing system, which can be used to implement a programmable system according to the present invention.

FIG. 12 (see U.S. Pat. No. 7,702,660, issued to Chan, expressly incorporated herein by reference), shows a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display device (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, hard disk, magnetic tape, or any other magnetic medium, a DVD-ROM, any other optical medium, a RAM, a PROM, and EPROM, a FLASH-EPROM, ferroelectric memory, any other memory chip or cartridge, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In this description, several preferred embodiments were discussed. Persons skilled in the art will, undoubtedly, have other ideas as to how the systems and methods described herein may be used. It is understood that this broad invention is not limited to the embodiments discussed herein. Rather, the invention is limited only by the following claims.

What is claimed is:

1. A method for dynamically changing a quality of service of a radio communication system, comprising:
   receiving a request for an increase in quality of service;
   authenticating the request;
   determining availability of an allocable resource associated with the quality of service;
   adjusting an allocation of the resource to alter the quality of service, wherein the adjustment of the allocation of the resource comprises altering an availability of aggregate communication capacity in at least two different communication bands for concurrent communication of information through the radio communication system in the at least two different communication bands and the adjustment of the allocation of the resource alters a predicted bit error rate of the communication of the information through the radio communication system;
   metering the usage of the allocated resource, comprising determining a statistical measure of quality of service dependent on at least the predicted bit error rate; and
   based on a level of said metered usage of the allocated resource, at least one of:
   reverting the allocation of the resource, and
   recommencing at least the authenticating, and metering.

2. The method according to claim 1, wherein the receiving a request comprises receiving a communication initiated by a human user.

3. The method according to claim 1, wherein the receiving a request comprises receiving a communication initiated by a cellular radio communication system carrier.

4. The method according to claim 1, wherein the receiving a request comprises receiving a communication initiated by a sponsor.

5. The method according to claim 1, wherein the receiving a request comprises receiving a communication automatically initiated by an application program executing on a cellular handset.

6. The method according to claim 1, wherein the adjusting an allocation of the resource to alter the quality of service comprises increasing an available bandwidth in a communication band.

7. The method according to claim 1, wherein the adjusting an allocation of the resource to alter the quality of service comprises increasing available communication bandwidth in at least one of the at least two different communication bands for concurrently communicating different information in each of the respective communication bands, the at least two different communication bands each communicating according to a wideband multiplexed multiple-access protocol.

8. The method according to claim 1, wherein the communication system comprises a cellular radio communication system, and said determining availability of an allocable resource comprises communicating between a central policy server and a cell site server.

9. The method according to claim 1, wherein said metering comprises timing a duration of the alteration of the quality of service.

10. The method according to claim 1, wherein said metering comprises determining a quantity of data communicated.

11. The method according to claim 1, wherein said metering comprises determining a duration of the altered allocation of resources.

12. The method according to claim 1, wherein based on the level of said metered usage of the allocated resource and upon exceeding a metering threshold, the quality of service reverts to a quality of service level existing prior to receiving the request.

13. The method according to claim 1, wherein based on the level of said metered usage of the allocated resource and upon exceeding a metering threshold, the metering is recommenced and the quality of service is maintained at the altered quality of service level existing prior to receiving the request.

14. A processor for dynamically changing the quality of service for a user of a radio communication system, comprising:
  an input port configured to receive a request for a change in allocation of a communication resource, to alter a quality of service;
  an output port configured to query a control server to determine availability of the communication resource for allocation to alter the quality of service; and
  at least one processor configured:
    to authenticate the request,
    to initiate the alteration in the quality of service of the communication if the control server indicates availability by altering an availability of aggregate communication capacity in at least two different communication bands for concurrent communication of information through the radio communication system in the at least two different communication bands, and the altering of the availability of aggregate communication capacity alters a predicted bit error rate of the communication of the information through the radio communication system,
    meter a usage of the allocated resource, comprising a determined statistical measure of quality of service dependent on at least the predicted bit error rate;
    to determine whether the metered usage of the communication resource exceeds a limit, and upon exceeding the limit, and
    to deauthorize the altered allocation of resources.

15. The processor according to claim 14, wherein the request is automatically initiated by a mobile cellular radio transceiver.

16. The processor according to claim 14, wherein the request is automatically initiated by a cellular radio communication system carrier.

17. The processor according to claim 14, wherein the alteration in the availability of communication capacity comprises increasing available radio communications bandwidth in at least one of the at least two different communication bands.

18. The processor according to claim 14, wherein said metered usage further comprises a parameter selected from the group consisting of a timing a duration of increased quality of service, and a determination of a quantity of data communicated.

19. A method for dynamically changing a quality of service of a radio communication system for communicating information through spread spectrum communication streams, comprising:
  receiving a request for an increase in quality of service of an allocable resource;
  authenticating the request for an increase in quality of service of the allocable resource with a policy server;
  determining availability of the increase of quality of service of the allocable resource, the increase of the quality of service of the allocable resource comprising providing additional aggregate communication capacity in at least two different communication bands for concurrent communication of information through the radio communication system in the at least two different communication bands;
  if the availability of the increase of quality of service of the allocable resource is available and the request is authenticated, altering the quality of service to increase the aggregate radio communication capacity in the at least two different communication bands for use by a wireless device associated with the request, wherein the altering of the quality of service is associated with a change in a predicted bit error rate of the communication of the information through the radio communication system;
  metering the usage of the allocable resource by the wireless device associated with the request, comprising determining a statistical measure of quality of service dependent on at least the predicted bit error rate; and
  based on a level of said metered usage of the allocable resource by the wireless device associated with the request, at least one of:
    reverting the quality of service of the allocable resource, and
    recommencing at least the authenticating and metering.

* * * * *